United States Patent
Hattori et al.

(10) Patent No.: US 7,959,226 B2
(45) Date of Patent: Jun. 14, 2011

(54) VEHICLE SEATS

(75) Inventors: Tsunetoshi Hattori, Nagoya (JP); Naoki Fujikawa, Nagoya (JP)

(73) Assignee: Toyota Boshoku Kabushiki Kaisha, Aichi-Ken (JP)

( * ) Notice: Subject to any disclaimer, the term of this patent is extended or adjusted under 35 U.S.C. 154(b) by 349 days.

(21) Appl. No.: 12/163,123

(22) Filed: Jun. 27, 2008

(65) Prior Publication Data
US 2009/0008974 A1    Jan. 8, 2009

(30) Foreign Application Priority Data

Jul. 3, 2007  (JP) .................... 2007-175045
Aug. 28, 2007 (JP) .................... 2007-221014
Dec. 5, 2007  (JP) .................... 2007-314732

(51) Int. Cl.
    *A47C 7/72*   (2006.01)
(52) U.S. Cl. ............ 297/217.3; 297/188.05; 348/837
(58) Field of Classification Search ............ 297/217.3, 297/188.05; 348/836, 837, E5.128
    See application file for complete search history.

(56) References Cited

U.S. PATENT DOCUMENTS

| 7,036,936 B2 | 5/2006 | Hattori et al. |
| 7,510,241 B2 * | 3/2009 | Nathan et al. ......... 297/217.3 X |
| 2004/0239155 A1 | 12/2004 | Fourrey et al. |
| 2008/0203788 A1 | 8/2008 | Hattori et al. |
| 2009/0085383 A1 * | 4/2009 | Hicks et al. ............. 297/217.3 |

FOREIGN PATENT DOCUMENTS

| JP | 2001-347893 A | 12/2001 |
| JP | 2004-352239 A | 12/2004 |
| JP | 2005-077716 A | 3/2005 |

OTHER PUBLICATIONS

English language Abstract of JP 2004-352239 A.
English language Abstract of JP 2005-077716 A.
English language Abstract of JP 2001-347893 A.
U.S. Appl. No. 11/909,834 to Kuno et al., which was filed on Sep. 27, 2007.

* cited by examiner

*Primary Examiner* — Anthony D Barfield
(74) *Attorney, Agent, or Firm* — Greenblum & Bernstein, P.L.C.

(57) ABSTRACT

A vehicle seat may include a monitor device that is movably disposed in a back board of a seat back, and a drive mechanism coupled to the base portion of the monitor device. The monitor device includes a base portion and a monitor portion. The drive mechanism is arranged and constructed to move the monitor portion through a slot formed in the back board between a retracted position in which the monitor portion is positioned in an interior of the back board and a use position in which the monitor portion is positioned in an exterior of the back board while a display surface of the monitor portion is maintained in substantially parallel to the back board. The monitor portion is connected to the base portion so as to be rotatable about an axis that is perpendicular to a moving direction of the monitor portion.

2 Claims, 23 Drawing Sheets

VEHICLE SEATS

This application claims priority to Japanese patent applications serial numbers 2007-175045, 2007-221014 and 2007-314732, the contents of which are incorporated herein by reference.

BACKGROUND OF THE INVENTION

The present invention relates to vehicle seats. More particularly, the present invention relates to vehicle seats each having a monitor device that is received in a seat back thereof.

A vehicle seat having a monitor device or other such device that is received in a seat back is already known. Such a vehicle seat is taught, for example, by Japanese Laid-Open Patent Publication Number 2004-352239.

In the known vehicle seat taught by No. 2004-352239, a monitor device is attached to a back board of the seat back, so that a rear passenger sitting on a rear seat can use the monitor device. In particular, the monitor device is vertically rotatably attached to the back board of the seat back via hinges, so as to be normally be retracted in a recessed portion formed in the back board. In order to use the monitor device, the monitor device maintained in a retracted condition is upwardly rotated or turned over, so as to be changed to a use condition in which a display surface of the monitor device is directed backwardly (i.e., directed toward the rear passenger). Thus, the rear passenger can see the display surface of the monitor device.

Further, such a vehicle seat is taught, for example, by Japanese Laid-Open Patent Publication Number 2005-77716.

In the known vehicle seat taught by No. 2005-77716, a projection screen (a monitor device) is provided to the seat back, so that a rear passenger sitting on a rear seat can use the projection screen. In particular, the projection screen is vertically slidably attached to the seat back, so as to normally be retracted in the seat back. In order to use the projection screen, the projection screen maintained in a retracted condition is upwardly slid, so as to be changed to a use condition in which the projection screen is pulled out upwardly. Thus, the rear passenger can see a projection surface of the projection screen. Further, the projection screen is retracted in the seat back while a projection surface thereof is directed backwardly. Therefore, the screen can be directly used without being rotated after the screen is pulled out upwardly.

Further, Japanese Laid-Open Patent Publication Number 2001-347893 teaches a car AV device, e.g., a car liquid crystal display TV, a car navigation device or other such devices. In the car AV device, a monitor device is retractably attached to a dashboard of a vehicle, so that a passenger can use the monitor device as needed. In particular, the monitor device is attached to a slide base that is slidably received in the dashboard, so as to normally be retracted in the dashboard. In addition, the monitor device is arranged and constructed to be vertically rotate relative to the slide base. In order to use the monitor device, the monitor device maintained in a retracted condition is slid forwardly (outwardly), so as to be pulled out from the dashboard. Thereafter, the monitor device is upwardly rotated relative to the slide base, so as to be changed to a use condition in which a display surface of the monitor device is directed backwardly. Thus, a passenger can see the display surface of the monitor device.

Further, in the car AV device, the monitor device is arranged and constructed to be slid and rotated via a sliding drive unit and a rotation drive unit that are independently constructed.

BRIEF SUMMARY OF THE INVENTION

For example, in one aspect of the present invention, a vehicle seat may include a monitor device that is movably disposed in a back board of a seat back, and a drive mechanism coupled to the base portion of the monitor device. The monitor device includes a base portion and a monitor portion. The drive mechanism is arranged and constructed to move the monitor portion through a slot formed in the back board between a retracted position in which the monitor portion is positioned in an interior of the back board and a use position in which the monitor portion is positioned in an exterior of the back board while a display surface of the monitor portion is maintained in substantially parallel to the back board. The monitor portion is connected to the base portion so as to be rotatable about an axis that is perpendicular to a moving direction of the monitor portion.

According to the vehicle seat thus constructed, it is not necessary to turn over the monitor portion in order to change the monitor portion from the retracted position to the use position. Therefore, a rear passenger can easily and smoothly change the monitor portion from the retracted position to the use position. Also, the monitor portion can be tilted to an optimal use position by simply rotating the monitor portion relative to the base portion.

In another aspect, a vehicle seat may include a monitor device that is movably disposed in a back board of a seat back, and a drive mechanism coupled to the monitor device. The drive mechanism is arranged and constructed to move the monitor device through a slot formed in the back board between a retracted position in which the monitor device is positioned in an interior of the back board and a use position in which the monitor device is positioned in an exterior of the back board. The drive mechanism is arranged and constructed to rotate the monitor device when the monitor device is located in the use position.

According to this vehicle seat, the monitor device can be automatically tilted to an optimal use position after the monitor device is moved to the use position. In addition, the monitor device can be rotated to the optimal use position by means of the drive mechanism that is used to move the monitor device between the retracted position and the use position. Therefore, it is not necessary to provide an additional drive mechanism in order to rotate the monitor device. This may lead to a reduced manufacturing cost of the seat.

In a further aspect, a vehicle seat may include a monitor device that is capable of moving between a retracted position in which the monitor device is positioned in an interior of a seat back and a use position in which the monitor device is positioned in an exterior of the seat back, a drive mechanism that is arranged and constructed to move the monitor device between the retracted position and the use position, a collision prediction system, and a monitor controlling system that is connected to the collision prediction system and the drive mechanism. The monitor controlling system is constructed to determine if the monitor device is located in the use position or the retracted position when the collision prediction system determines that a vehicle collision cannot be avoided, and to actuate the drive mechanism so as to move the monitor device to the retracted position when it is determined that the monitor device is located in the use position.

According to this vehicle seat, the monitor device can be automatically moved to the retracted position before the vehicle collision happens. Therefore, even if the vehicle collision actually happens, a rear passenger can be effectively prevented form contacting the monitor device. As a result, the monitor device can be effectively prevented form being damaged. In addition, the rear passenger can be effectively prevented form being injured.

In a still further aspect, a vehicle seat may include a monitor device that is capable of moving between a retracted position in which the monitor device is positioned in an interior of a seat back and a use position in which the monitor device is positioned in an exterior of the seat back, a collision prediction system, and a monitor controlling system that is connected to the collision prediction system and the monitor device. The monitor controlling system is constructed to determine if the monitor device is located in the use position or the retracted position when the collision prediction system determines that a vehicle collision cannot be avoided, and to stop power supply to the monitor device when it is determined that the monitor device is located in the use position.

According to this vehicle seat, the power supply to the monitor device can be automatically stopped before the vehicle collision happens. Therefore, even if the vehicle collision actually happens, the monitor device can effectively be avoided from being fired or over heated due to wiring disconnection produced therein.

Other objects, features and advantages of the present invention will be readily understood after reading the following detailed description together with the accompanying drawings and the claims.

DETAILED DESCRIPTION OF THE INVENTION

Representative examples of the present invention have been described in detail with reference to the attached drawings. This detailed description is merely intended to teach a person of skill in the art further details for practicing preferred aspects of the present invention and is not intended to limit the scope of the invention. Only the claims define the scope of the claimed invention. Therefore, combinations of features and steps disclosed in the foregoing detail description may not be necessary to practice the invention in the broadest sense, and are instead taught merely to particularly describe detailed representative examples of the invention. Moreover, the various features taught in this specification may be combined in ways that are not specifically enumerated in order to obtain additional useful embodiments of the present invention.

Detailed representative embodiments of the present invention are shown in FIG. 1 to FIG. 23.

First Detailed Representative Embodiment

A first detailed representative embodiment of the present invention will be described with reference to FIGS. 1 to 6.

Figure 1:
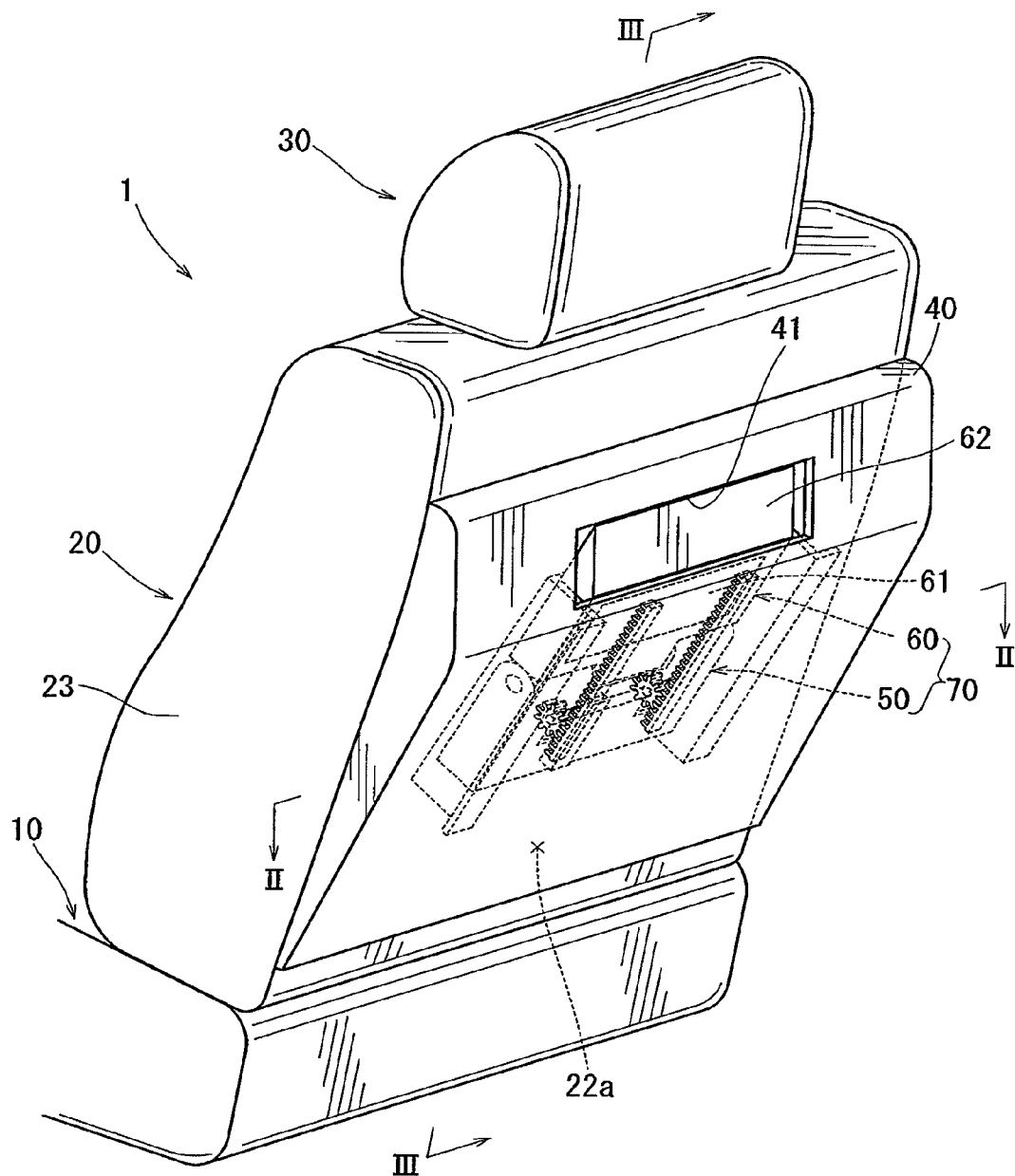
FIG. 1 is a rear perspective view of a vehicle seat according to a first representative embodiment of the present invention, which illustrates a condition in which a monitor portion of a monitor device is located in a retracted position.

As shown in FIG. 1, a representative vehicle seat 1 may preferably be arranged as a front seat (e.g., a driver seat or a passenger seat) of a vehicle (not shown). The vehicle seat 1 includes a seat cushion 10 and a seat back 20 having a head rest 30. The seat back 20 is rotatably connected to the seat cushion 10 via a reclining mechanism (not shown).

Figure 2:
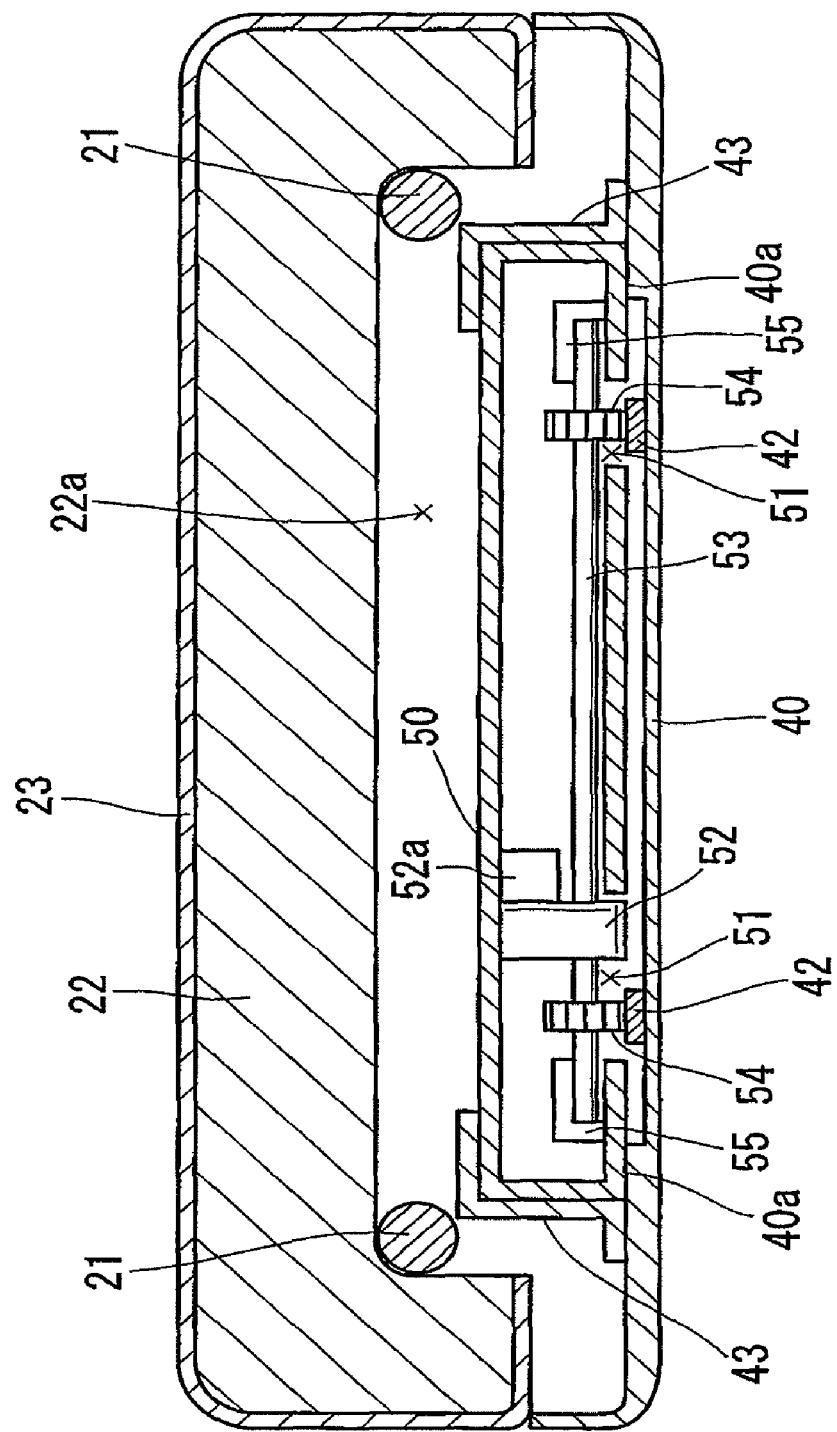
FIG. 2 is a cross-sectional view taken along line II-II in FIG. 1.
Figure 3:
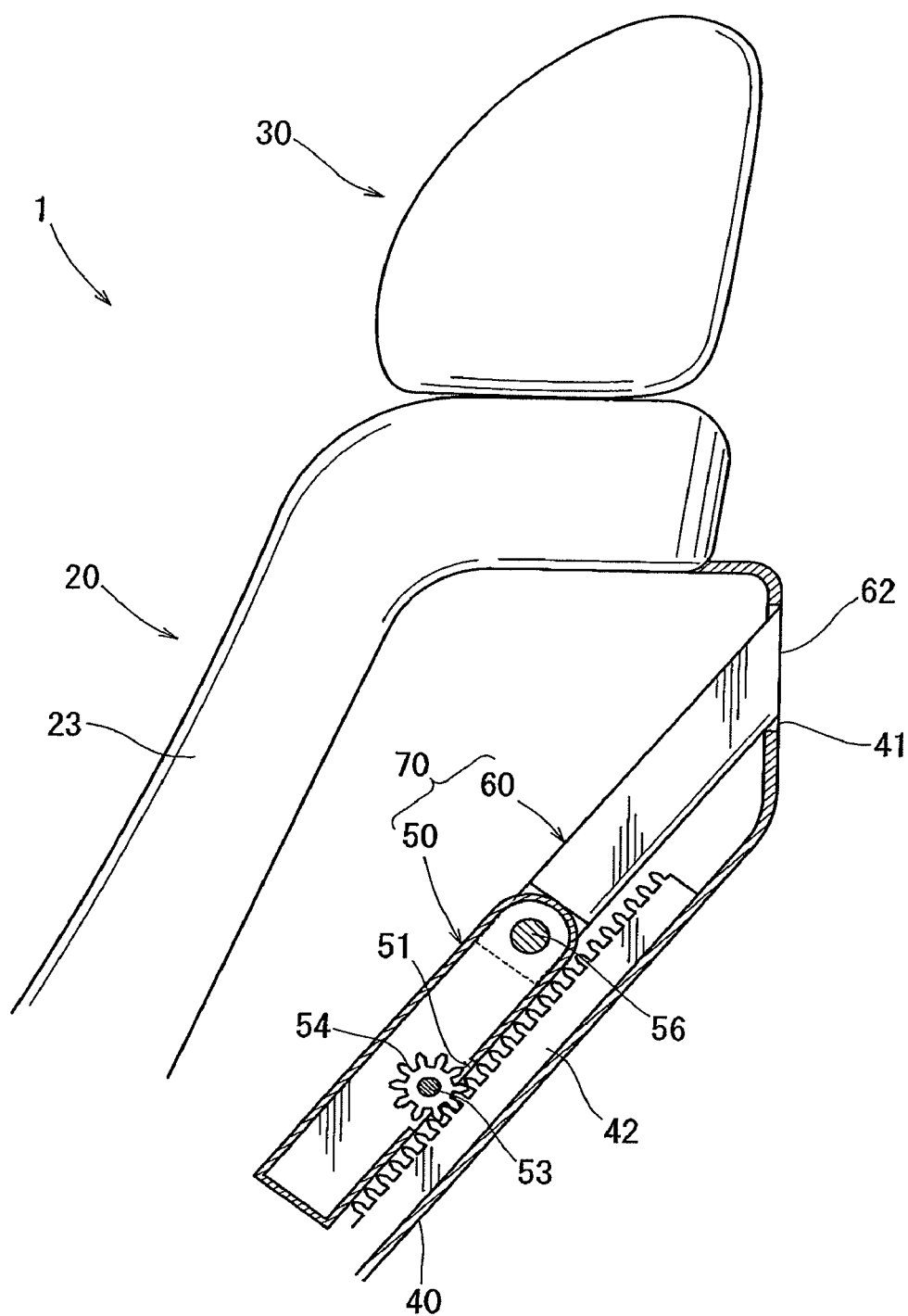
FIG. 3 is a cross-sectional view taken along line III-III in FIG. 1.

As shown in FIGS. 2 and 3, the seat back 20 may preferably include a pair of vertical side frame 21, a cushion pad 22 attached to the side frames 21, and a covering member 23 that covers the cushion pad 22. Further, the seat back 20 includes a back board 40 that is arranged and constructed to cover a rear recessed portion 22a formed in the cushion pad 22. The back board 40 is attached to the cushion pad 22 via attachment bolts (not shown). The back board 40 is generally integrally formed from rigid resinous materials. The back board 40 has an outwardly convexed panel shape, so as to define an inner space therein which space is continuous with the rear recessed portion 22a of the cushion pad 22.

As best shown in FIG. 1, a laterally elongated slot 41 is formed in an upper portion of the back board 40, so that an interior (the inner space) of the back board 40 can be communicated with an exterior of the back board 40 therethrough.

The slot 41 is arranged and constructed such that a monitor portion 60 of a monitor device 70 (which will be described hereinafter) can move or reciprocate therethrough between a retracted position (FIG. 1) in which the monitor portion 60 is positioned in the interior of the back board 40 (or the rear recessed portion 22a of the cushion pad 22) and a projected or use position (FIG. 5) in which the monitor portion 60 is positioned in the exterior of the back board 40. Further, the monitor portion 60 may preferably be arranged so as to be positioned behind the head rest 30 when it is moved to the use position.

Figure 4:
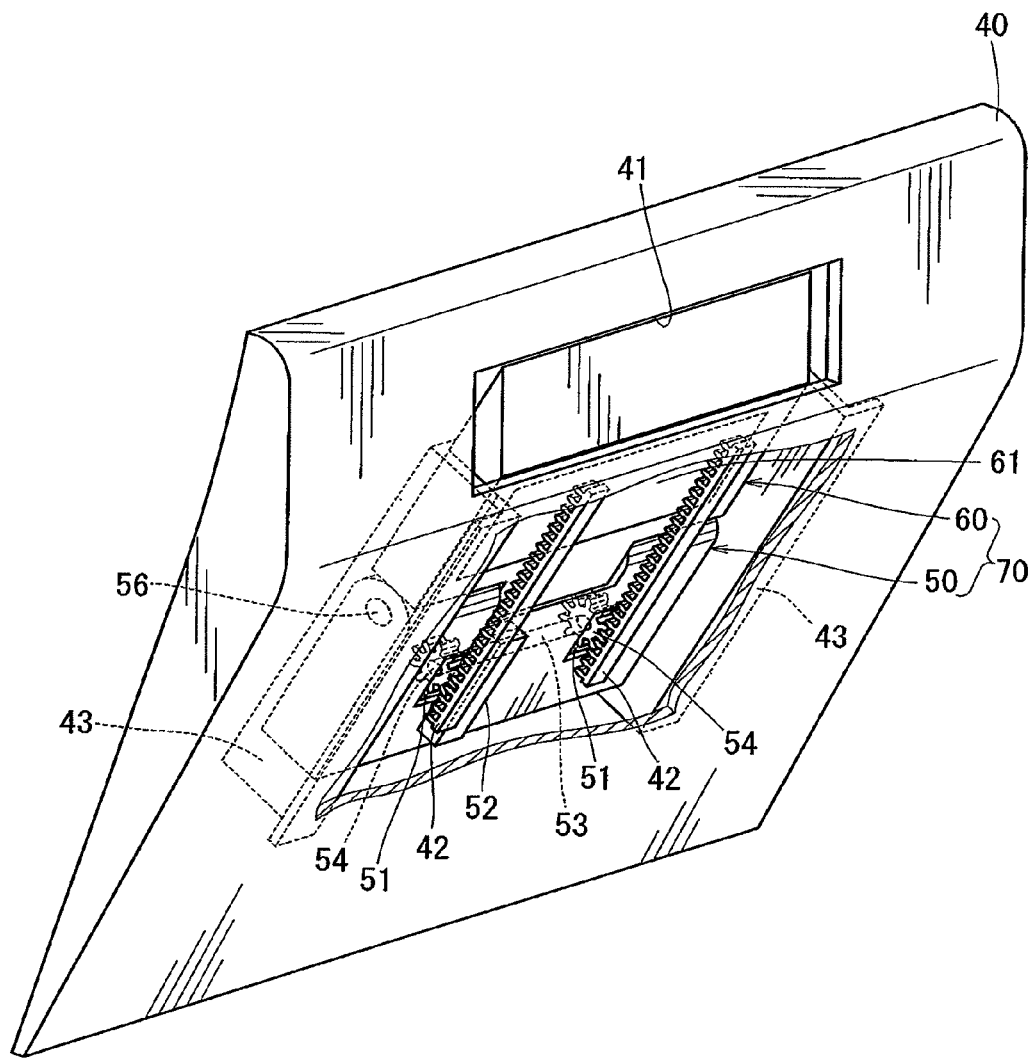
FIG. 4 is an enlarged perspective view of the vehicle seat shown in FIG. 1, in which a back board is partially cut away.

As best shown in FIG. 3, the monitor device 70 is disposed in the inner space of the back board 40. The monitor portion 60 of the monitor device 70 has a display surface 61 (FIG. 4). The monitor device 70 may preferably include a base portion 50 for supporting the monitor portion 60. The monitor portion 60 is vertically rotatably connected to the base portion 50 via a transverse shaft 56 that extends in a widthwise direction of the vehicle. That is, the monitor portion 60 is connected to the base portion 50 so as to be rotatable about an axis that is perpendicular to a reciprocating direction of the monitor portion 60. Naturally, the monitor device 70 is electrically connected to a power source (not shown).

As shown in FIGS. 2 and 3, the base portion 50 has a box shape and is arranged and constructed to vertically move along an inner surface of the back board 40. In particular, as shown in FIG. 2, the base portion 50 has a transverse rotary shaft 53 that is disposed therein. The rotary shaft 53 is rotatably supported by a pair of bearing members 55 that are disposed in the base portion 50. Further, the base portion 50 has a pair of pinion gears 54 that are disposed therein. The pinion gears 54 are laterally spaced apart from each other and are unrotatably attached to the rotary shaft 53. Further, the rotary shaft 53 is coupled to a gearing device 52 (an actuator) that is disposed in the base-portion 50. The gearing device 52 is provided with a drive motor 52a (a drive source). The gearing device 52 may preferably includes a reduction gear mechanism. Further, a pair of slots 51 are formed in a bottom wall of the base portion 50 that faces the back board 40, so that a toothed periphery of each of the pinion gears 54 can be partly protruded toward the back board 40 therethrough.

Conversely, as shown in FIGS. 2 and 3, a pair of racks 42 are attached to the inner surface of the back board 40 so as to vertically linearly extend therealong over a desired length. The racks 42 have upper toothed surfaces and are arranged and constructed to engage the pinion gears 54 of the base portion 50. Further, a pair of guide frames 43 are attached to guide portions 40a formed in the inner surface of the back board 40 so as to vertically extend therealong. The guide frames 43 are arranged and constructed to laterally support the base portion 50 such that the base portion 50 can vertically move or slide therealong while it is maintained in parallel to the back board 40. Also, the guide frames 43 are arranged and constructed such that the pinion gears 54 may preferably be prevented from being disengaged from the racks 42 when the base portion 50 is moved.

Upon rotation of the drive motor 52a of the gearing device 52 in a normal direction or a reverse direction, the rotary shaft 53 is rotated via the gearing device 52, so that the pinion gears 54 meshing with the racks 42 are rotated along the racks 42 in a normal direction or a reverse direction. As a result, the base portion 50 is moved upwardly or downwardly, so that the monitor portion 60 connected to the base portion 50 is dependently moved or reciprocated between the retracted position and the use position thereof while it is maintained in parallel to the back board 40. As will be appreciated, in order to use the monitor device 70 (the monitor portion 60), the drive motor 52a is rotated in the normal direction, so as to move the monitor portion 60 from the retracted position (FIG. 1) to the use position (FIG. 5).

Thus, the pinion gears 54, the rotary shaft 53, the gearing device 52, the drive motor 52a and the racks 42 may constitute a drive mechanism for moving the monitor portion 60 (the monitor device 70). Further, the pinion gears 54 and the racks 42 will be referred to as a monitor device transferring mechanism.

Thus, the base portion 50 is movably attached to the inner surface of the back board 40 such that the monitor portion 60 can reciprocate through the slot 41 between the retracted position and the use position while the display surface 61 thereof is maintained in parallel to the back board 40. Further, the monitor device transferring mechanism is arranged and constructed to move the monitor portion 60 between the retracted position and the use position.

Figure 5:
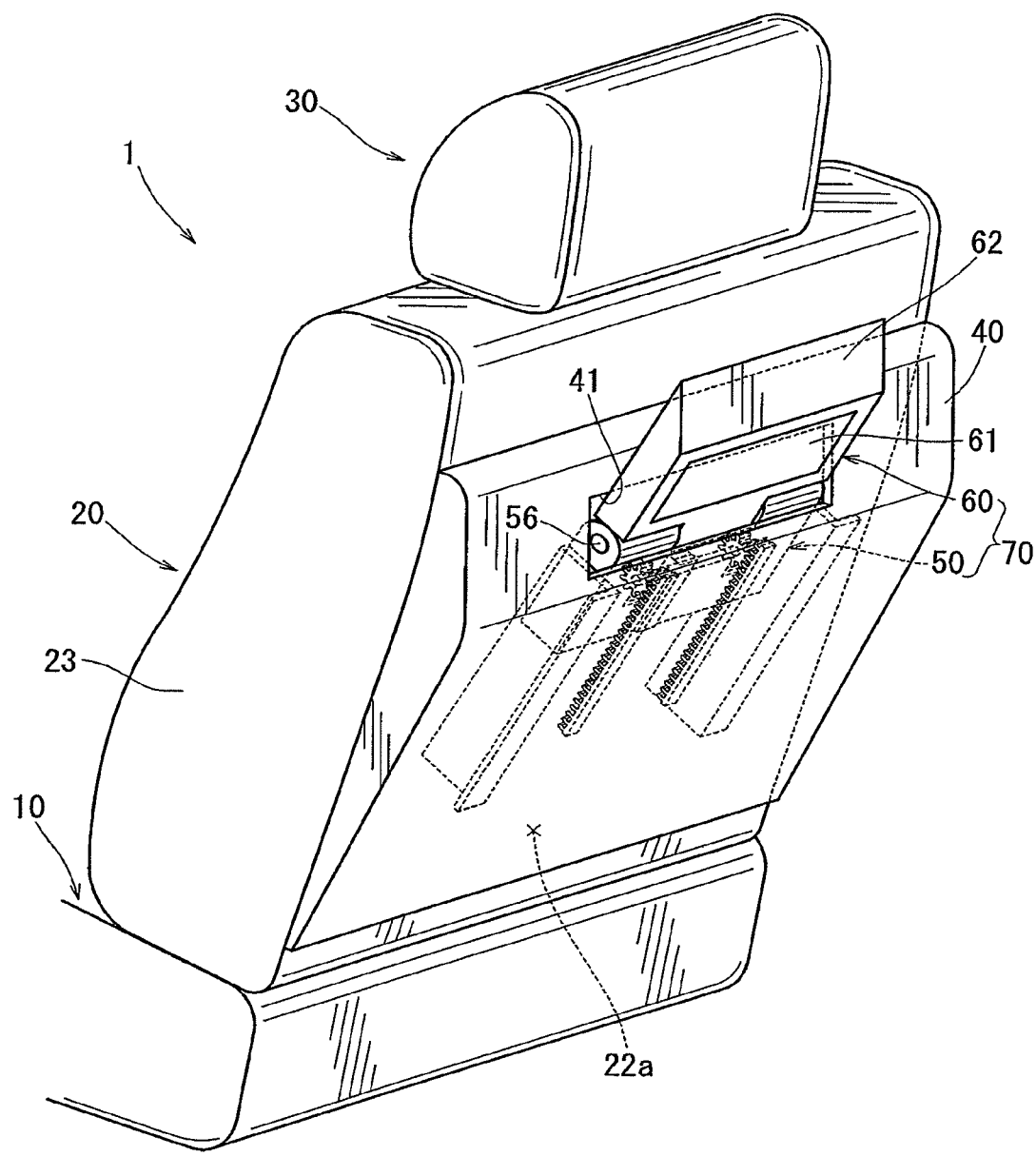
FIG. 5 is a view similar to FIG. 1, which illustrates a condition in which the monitor portion is located in a use position.

As will be appreciated, the monitor device 70 may preferably provided with a travel-limiting device (not shown), so that the monitor portion 60 (the base portion 50) can be reliably prevented from moving beyond the retracted position (FIG. 1) and the use position (FIG. 5). The travel-limiting device may include an electric device (e.g., a limit switch) and a mechanical device (e.g., stopping members).

Figure 6:
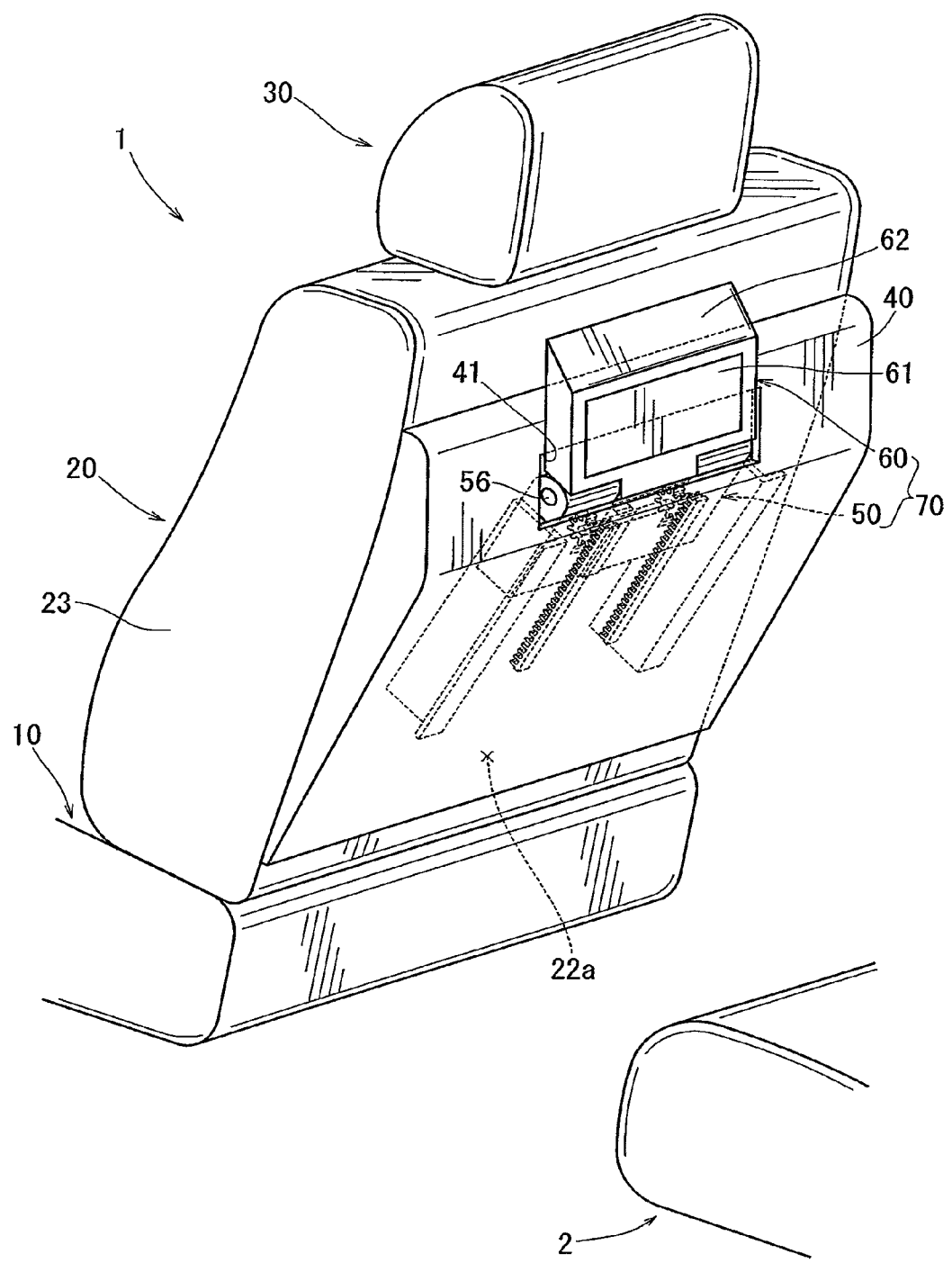
FIG. 6 is a view similar to FIG. 5, in which the monitor portion is vertically rotated or tilted from the use position to an optimal use position.

As best shown in FIG. 3, an upper end surface 62 of the monitor portion 60 is appropriately shaped, so as to be flush with an outer surface of the back board 40 when the monitor portion 60 is located in the retracted position. Further, as described above, the monitor portion 60 can be vertically rotated about the transverse shaft 56. Therefore, as shown in FIG. 6, the monitor device 60 can be tilted from the use position to an optimal use position in which the display surface 61 of the monitor device 60 faces a rear passenger sitting on a rear seat 2, so that the rear passenger can easily see the display surface 61 of the monitor device 60.

Operation of the monitor device 70 of the present embodiment will now be described.

First, in order to use the monitor device 70 (the monitor portion 60), the drive motor 52a of the gearing device 52 is rotated in the normal direction. Upon rotation of the drive motor 52a, the rotary shaft 53 is rotated via the gearing device 52, so that the pinion gears 54 meshing with the racks 42 are rotated in a normal direction or a reverse direction. As a result, the base portion 50 moves upwardly along the racks 42, so that the monitor portion 60 connected to the base portion 50 is moved from the retracted position (FIG. 1) to the use position (FIG. 5) via the slot 41. Thereafter, the monitor portion 60 is vertically rotated or tilted about the transverse shaft 56 by hand such that the display surface 61 of the monitor device 60 faces the rear passenger sitting on the rear seat 2. Thus, the monitor device 60 can be tilted from the use position (FIG. 5) to the optimal use position (FIG. 6).

According to the monitor device 70, it is not necessary to turn over the monitor portion 60 when the monitor portion is changed from the retracted position to the use position. Therefore, the monitor portion 60 cannot interfere with the rear passenger when the monitor portion is changed from the retracted position to the use position. As a result, the rear passenger can easily and smoothly change the monitor portion 60 from the retracted position to the use position.

Conversely, in order to retract the monitor device 70 (the monitor portion 60), the drive motor 52a is rotated in the reverse direction after the monitor portion 60 is returned from the optimal use position (FIG. 6) to the use position (FIG. 5) by hand, so as to move the monitor portion 60 from the use position (FIG. 5) to the retracted position (FIG. 1). When the monitor portion 60 is moved to the retracted position, the upper end surface 62 of the monitor portion 60 is flush with the outer surface of the back board 40. Therefore, the monitor portion 60 can be retracted without reducing an appearance of the seat back 20 (the back board 40). In addition, the upper end surface 62 of the monitor portion 60 may effectively prevent small articles (dust) from entering the back board 40 via the slot 41.

Further, in the present embodiment, the monitor device 70 (the base portion 50 and the monitor portion 60) is integrated with the back board 40. Also, the drive mechanism (i.e., the pinion gears 54, the rotary shaft 53, the gearing device 52, the drive motor 52a and the racks 42) is integrated with the back board 40. Therefore, the monitor device 70 and the drive mechanism can be easily separated from the seat back 20 by simply removing the back board 40. This may lead to easy maintenance of the monitor device 70 and the drive mechanism.

Naturally, various changes and modifications may be made to the present invention without departing from the scope of the invention. For example, in the embodiment, the drive mechanism (the monitor device transferring mechanism) includes a pair of pinion gears 54 and a pair of racks 42. However, the drive mechanism may include a single pinion gear and a single rack, if necessary.

Further, in the embodiment, a rack-pinion gear link mechanism is used as the monitor device transferring mechanism (the drive mechanism). However, various types of link mechanisms (e.g., a parallel link mechanism and a cross-bar link mechanism) can be used as the drive mechanism.

Moreover, in the embodiment, the base portion 50 is arranged and constructed to vertically move along the inner surface of the back board 40. However, the base portion 50 can be arranged and constructed to laterally or obliquely move along the inner surface of the back board 40.

Second Detailed Representative Embodiment

The second detailed representative embodiment will now described in detail with reference to FIGS. 7 to 13.

Because the second embodiment relates to the first embodiment, only the constructions and elements that are different from the first embodiment will be explained in detail. Elements that are the same in the first and second embodiments will be identified by the same reference numerals and a detailed description of such elements may be omitted.

Figure 9:
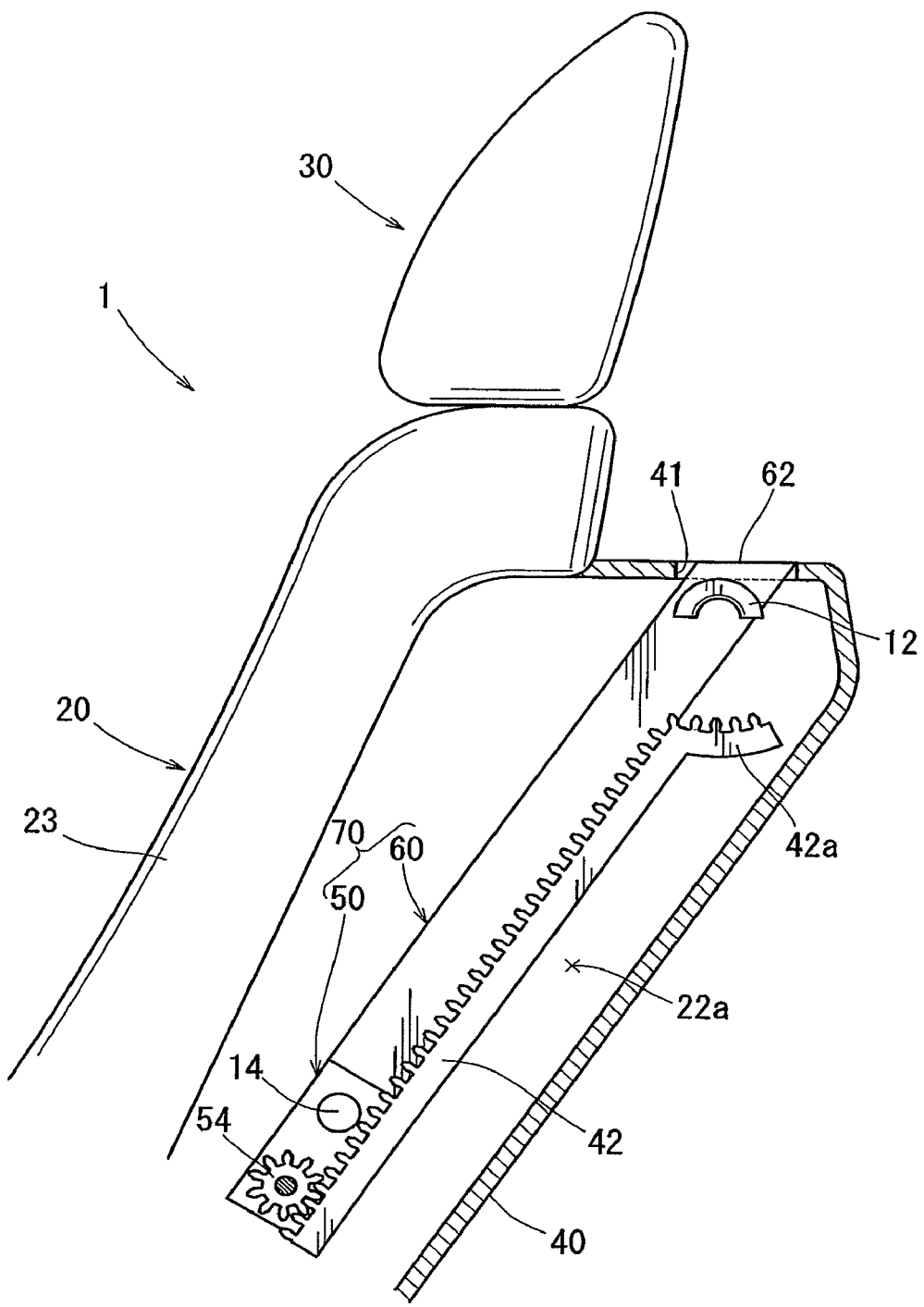
FIG. 9 is a cross-sectional view taken along line IX-IX in FIG. 7.

As best shown in FIG. 9, similar to the first embodiment, the monitor device 70 may preferably include the monitor portion 60 and the base portion 50. However, unlike the first embodiment, the monitor portion 60 may preferably be unrotatably connected to the base portion 50. Further, in this embodiment, the use position and the retracted position of the monitor portion 60 can respectively be referred to as the use position and the retracted position of the monitor device 70.

Figure 8:
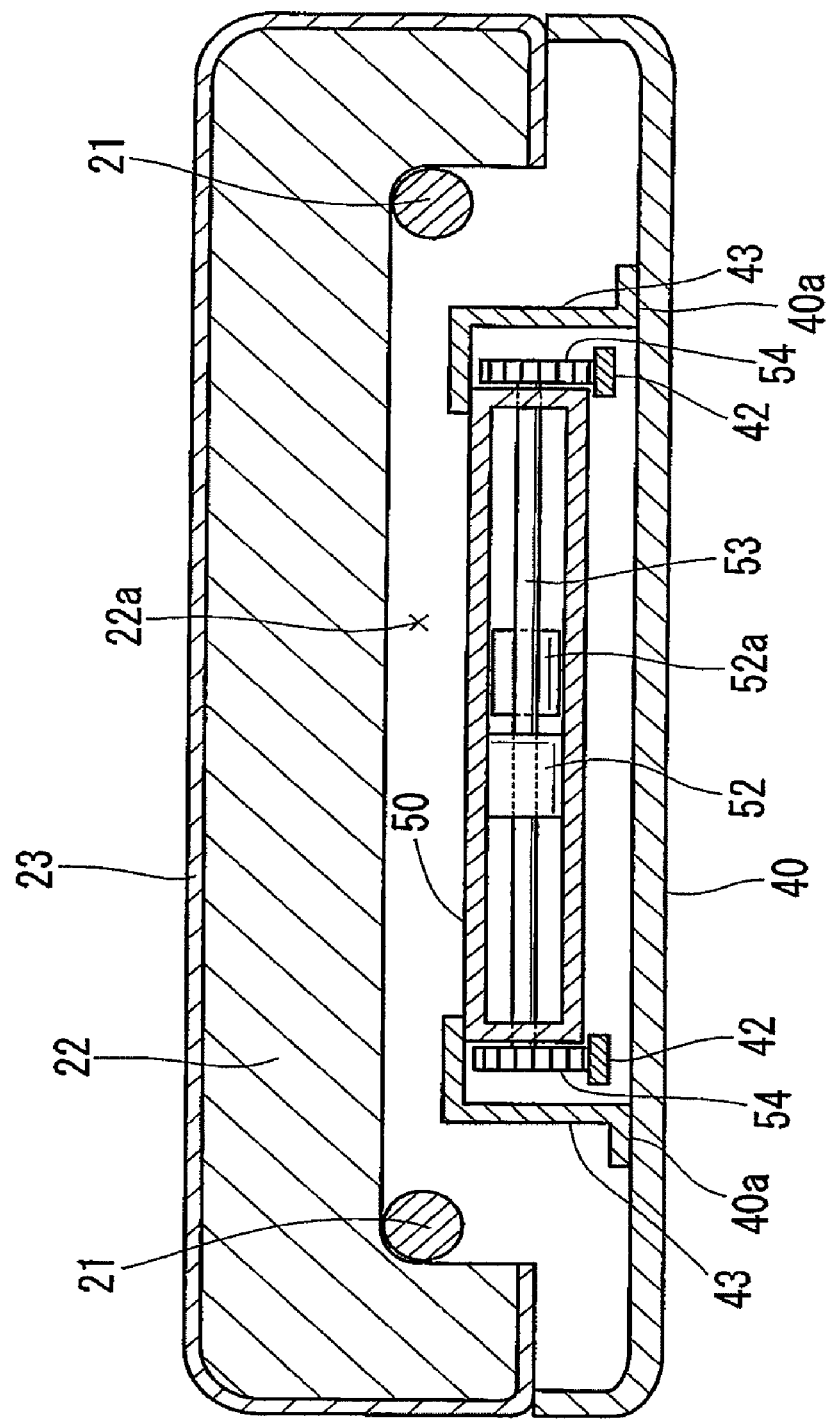
FIG. 8 is a cross-sectional view taken along line VIII-VIII in FIG. 7.

As shown in FIG. 8, similar to the first embodiment, the base portion 50 has the transverse rotary shaft 53 that is disposed therein. However, unlike the first embodiment, the rotary shaft 53 is laterally outwardly extended from side walls of the base portion 50 and is rotatably supported by baring members (not shown) attached to the side walls of the base portion 50. Further, the base portion 50 has a pair of pinion gears 54 that are disposed outwardly adjacent to the side walls thereof. The pinion gears 54 thus positioned are unrotatably attached to the rotary shaft 53. As will be appreciated, in this embodiment, the slots 51 that are formed in the base portion 50 in the first embodiment are omitted.

As shown in FIGS. 8 and 9, similar to the first embodiment, a pair of first or main racks 42 are attached to the inner surface of the back board 40. However, in this embodiment, as shown in FIG. 9, a pair second or additional racks 42a are positioned at upper ends of the racks 42. In particular, the additional racks 42a are respectively rearwardly continuously extended from the racks 42 and have upper concave toothed surfaces. Each of the additional racks 42a has an arcuate shape having a desired radius of curvature. Further, the additional racks 42a are arranged and constructed to start to mesh with the pinion gears 54 when the monitor portion 60 connected to the base portion 50 is shifted to the use position (FIG. 11).

Figure 10:
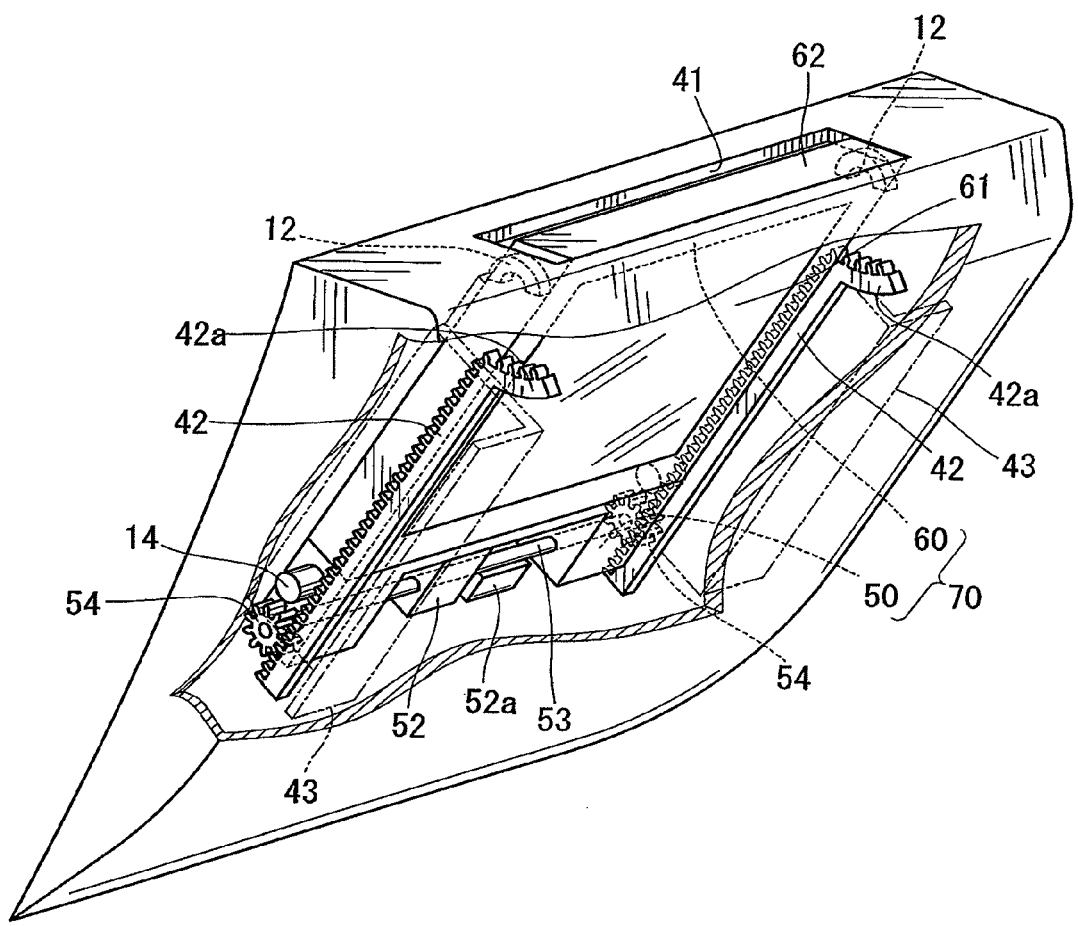
FIG. 10 is an enlarged perspective view of the vehicle seat shown in FIG. 7, in which a back board is partially cut away.

Further, as shown in FIG. 10, a pair of arcuate engagement projections (first engagement members) 12 each having an concave engagement surface are attached to the inner surface of the back board 40. The engagement projections 12 may preferably be positioned adjacent to opposite lateral peripheries of the slot 41. Conversely, as shown in FIG. 10, a pair of cylindrical engagement pins (second engagement members) 14 each having an cylindrical engagement surface are attached to opposite side surfaces of the base portion 50 so as to be positioned above the pinion gears 54. The engagement pins 14 may preferably be positioned to engage the engagement projections 12 when the monitor portion 60 connected to the base portion 50 is shifted to the use position (FIG. 11), so that the monitor portion 60 can be prevented from moving beyond the use position. That is, the engagement projections 12 and the engagement pins 14 may constitute stopper mechanisms that can prevent the monitor portion 60 (the monitor device 70) from moving beyond the use position. Further, the engagement pins 14 may preferably have a shape complementary to the engagement projections 12, so as to be smoothly rotatably engaged with each other. Therefore, upon engagement of the engagement pins 14 and the engagement projections 12, the base portion 50 (the monitor portion 60) can rotate about engagement portions of the engagement pins 14 and the engagement projections 12. That is, the engagement portions of the engagement pins 14 and the engagement projections 12 may function as an rotational axis. As will be appreciated, the engagement pins 14 and the engagement projections 12 are arranged and constructed such that when the engagement pins 14 and the engagement projections 12 are engaged with each other, a distance between the engagement portions thereof and the pinion gears 54 is equal to the radius of curvature of the additional racks 42a.

In this structure thus constructed, similar to the first embodiment, upon rotation of the drive motor 52a of the gearing device 52 in the normal direction or the reverse direction, the rotary shaft 53 is rotated via the gearing device 52, so that the pinion gears 54 meshing with the racks 42 are rotated along the racks 42 in a normal direction or a reverse direction. As a result, the base portion 50 is moved upwardly or downwardly, so that the monitor portion 60 connected to the base portion 50 is dependently moved or reciprocated between the retracted position and the use position thereof while it is maintained in parallel to the back board 40.

Figure 11:
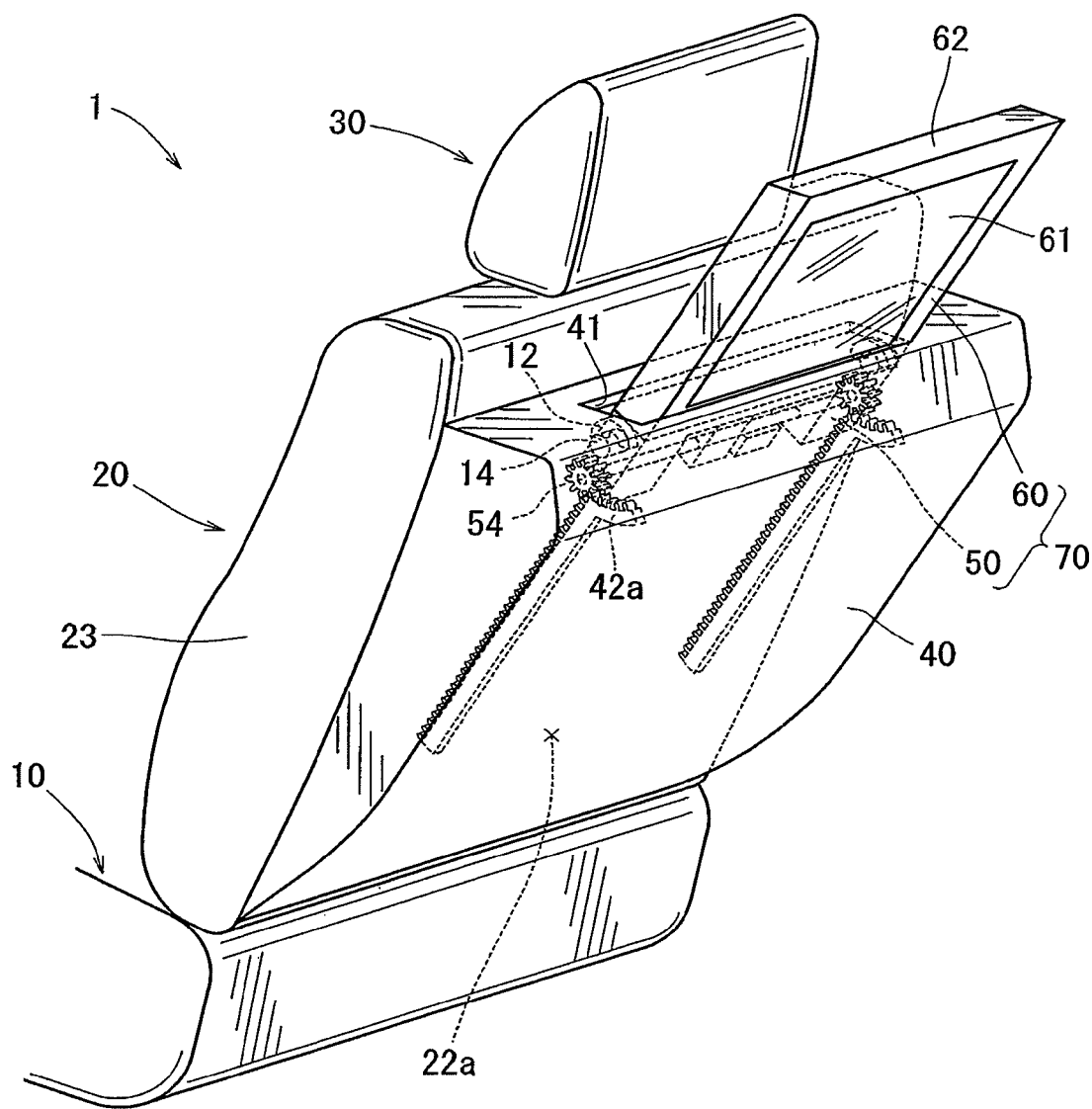
FIG. 11 is a view similar to FIG. 7, which illustrates a condition in which the monitor portion is located in a use position.
Figure 12:
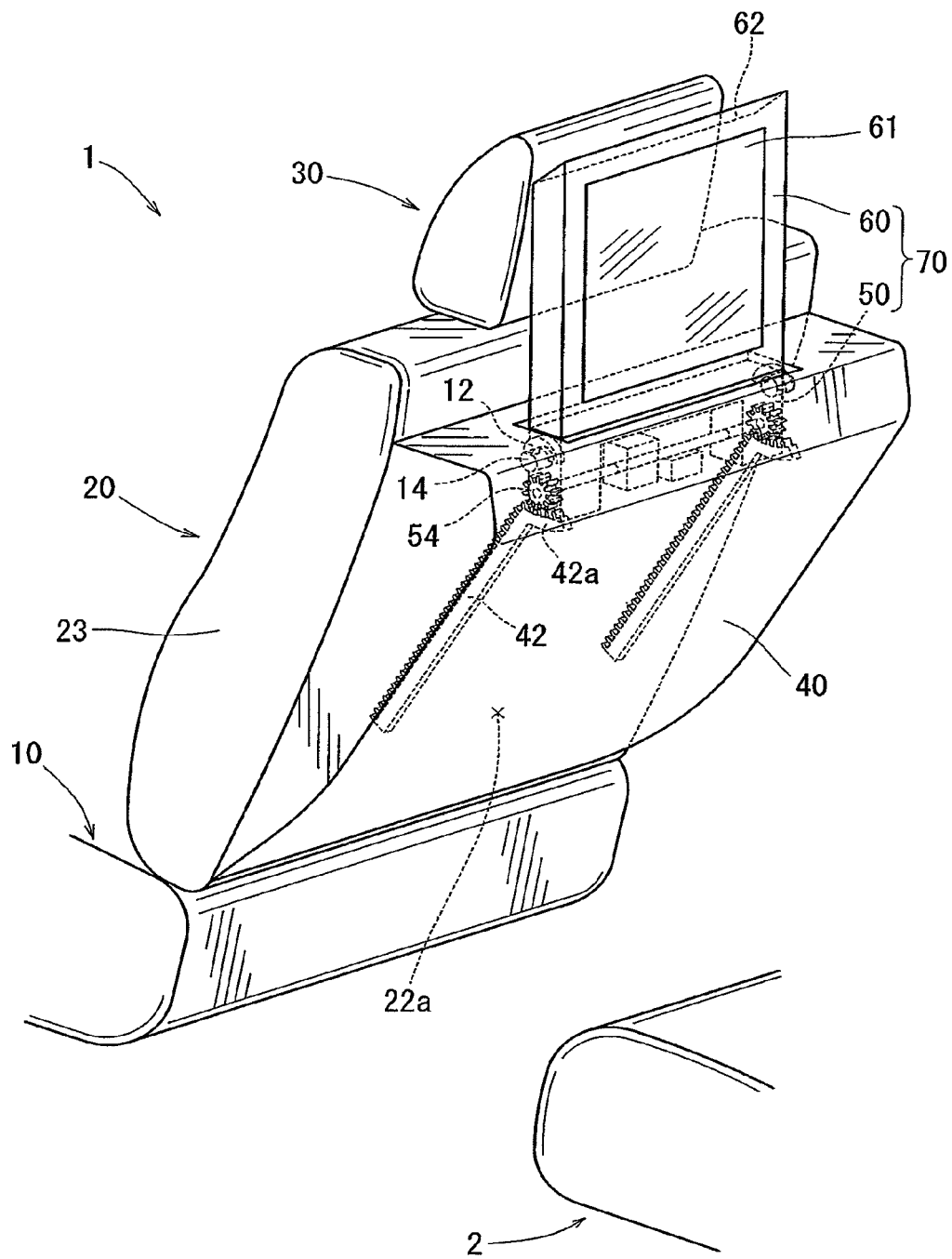
FIG. 12 is a view similar to FIG. 11, in which the monitor portion is vertically rotated or tilted from the use position to an optimal use position.

In this embodiment, as shown in FIG. 11, when the monitor portion 60 reaches the use position thereof upon rotation of the drive motor 52a in the normal direction, the engagement pins 14 can engage the engagement projections 12. At the same time, the pinion gears 54 can mesh with the additional racks 42a. Therefore, when the drive motor 52a is further rotated in the normal direction, the pinion gears 54 are rotated along the additional racks 42a. As a result, as shown in FIG. 12, the base portion 50 is rotated rearwardly about the engagement portions of the engagement pins 14 and the engagement projections 12, so that the monitor portion 60 connected to the base portion 50 is dependently rotated forwardly. Therefore, unlike the first embodiment, the monitor device 60 can be automatically tilted from the use position to the optimal use position over a predetermined angle range such that the rear passenger sitting on the rear seat 2 can easily see the display surface 61 of the monitor device 60. Further, as will be recognized, the slot 41 formed in the back board 40 may preferably be shaped such that the monitor device 60 can be smoothly rotated from the use position toward the optimal use position.

Thus, in this embodiment, the pinion gears 54, the rotary shaft 53, the gearing device 52, the drive motor 52a, the racks 42 and the additional racks 42a may constitute a drive mechanism for moving the monitor portion 60 (the monitor device 70). Further, the pinion gears 54 and the racks 42 will be referred to as a monitor device transferring mechanism. In addition, the pinion gears 54 and the additional racks 42a will be referred to as a monitor device tilting (rotating) mechanism.

Operation of the monitor device 70 of the second embodiment will now be described.

First, in order to use the monitor device 70 (the monitor portion 60), the drive motor 52a of the gearing device 52 is rotated in the normal direction. Similar to the first embodiment, upon rotation of the drive motor 52a, the rotary shaft 53 is rotated via the gearing device 52, so that the pinion gears 54 meshing with the racks 42 are rotated in a normal direction or a reverse direction. As a result, the base portion 50 moves upwardly along the racks 42, so that the monitor portion 60 connected to the base portion 50 is moved from the retracted position (FIG. 7) to the use position (FIG. 11) via the slot 41.

Thereafter, the drive motor 52a is further rotated in the normal direction. As a result, the pinion gears 54 meshing with the additional racks 42a are rotated along the additional racks 42a, so that the base portion 50 is rotated rearwardly about the engagement portion of the engagement pins 14 and the engagement projections 12. As a result, the monitor portion 60 connected to the base portion 50 is dependently rotated forwardly such that the display surface 61 of the monitor device 60 faces the rear passenger sitting on the rear seat 2. Thus, the monitor device 60 (the monitor device 70) can be tilted from the use position (FIG. 11) to the optimal use position (FIG. 12).

Figure 7:
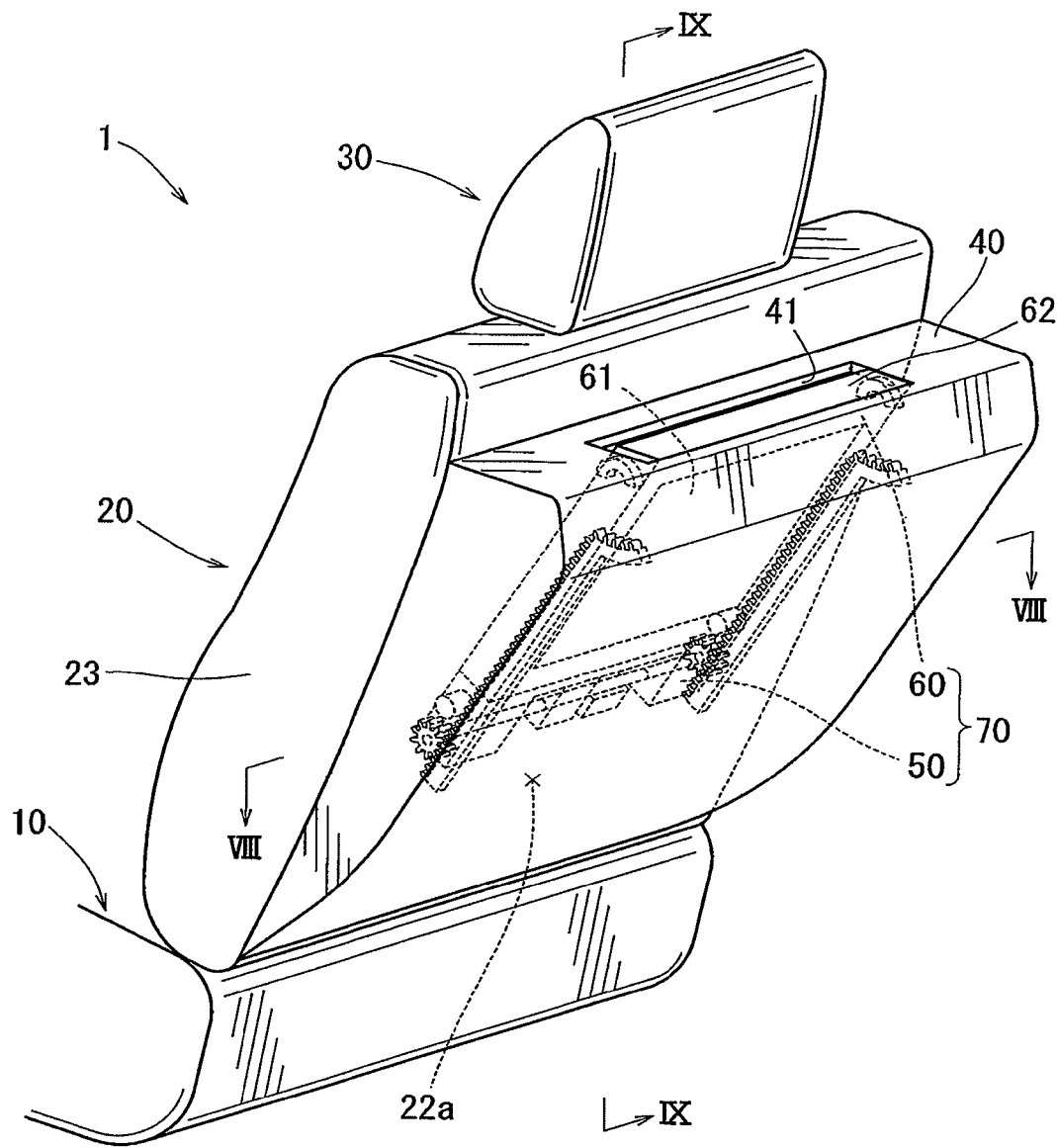
FIG. 7 is a rear perspective view of a vehicle seat according to a second representative embodiment of the present invention, which illustrates a condition in which a monitor portion of a monitor device is located in a retracted position.

Conversely, in order to retract the monitor device 70 (the monitor portion 60), the drive motor 52a is rotated in the reverse direction, so as to move the monitor portion 60 from the optimal use position (FIG. 12) to the use position (FIG. 11). Thereafter, the drive motor 52a is further rotated in the reverse direction, so as to move the monitor portion 60 (the monitor device 70) from the use position (FIG. 11) to the retracted position (FIG. 7).

Further, in the present embodiment, the monitor portion 60 (the monitor device 70) can be moved or reciprocated between the retracted position (FIG. 7) and the optimal use position (FIG. 12) by means of the drive motor 52a and the gearing device 52. In other words, the monitor device transferring mechanism and the monitor device tilting mechanism can be driven by a common drive source and a common actuator. Therefore, the number of components of the monitor device 70 can be reduced. This may lead to a reduced manufacturing cost of the seat 1.

The additional racks 42a are respectively integrated with the racks 42 so as to be continuously extended therefrom. Therefore, the monitor device 60 can be smoothly tilted from the use position (FIG. 11) to the optimal use position (FIG. 12).

The additional racks 42a are respectively arranged and constructed such that the monitor device 60 can be rotated over a desired angle range. That is, each of the additional racks 42a has a substantial length that permits the monitor device 60 to rotate from the use position to the optimal use position. Therefore, the pinion gears 54 may preferably be prevented from being disengaged from the additional racks 42a. In addition, the monitor portion 60 can be tilted such that the display surface 61 thereof faces the rear passenger even if the seat back 20 is tilted.

Further, in the present embodiment, the monitor device 70 (the base portion 50 and the monitor portion 60) is integrated with the back board 40. Also, the drive mechanism (the pinion gears 54, the rotary shaft 53, the gearing device 52, the drive motor 52a, the racks 42 and the additional racks 42a) are integrated with the back board 40. Therefore, the monitor device 70 and the drive mechanism can be easily separated from the seat back 20 by simply removing the back board 40. This may lead to easy maintenance of the monitor device 70 and the drive mechanism.

Various changes and modifications may be made in this embodiment. For example, the monitor device rotating or tilting mechanism may further include a fine adjustment mechanism, so that a tilting angle of the monitor device 60 can be precisely controlled.

Further, in this embodiment, the pinion gears 54, the rotary shaft 53 and the gearing device 52 of the drive mechanism are attached to the base portion 50. Conversely, the racks 42 and the additional racks 42a of the drive mechanism are attached to the back board 40. However, the pinion gears 54, the rotary shaft 53 and the gearing device 52 of the drive mechanism can be attached to the back board 40. Conversely, the racks 42 and the additional-racks 42a of the drive mechanism can be attached to the base portion 50.

Figure 13:
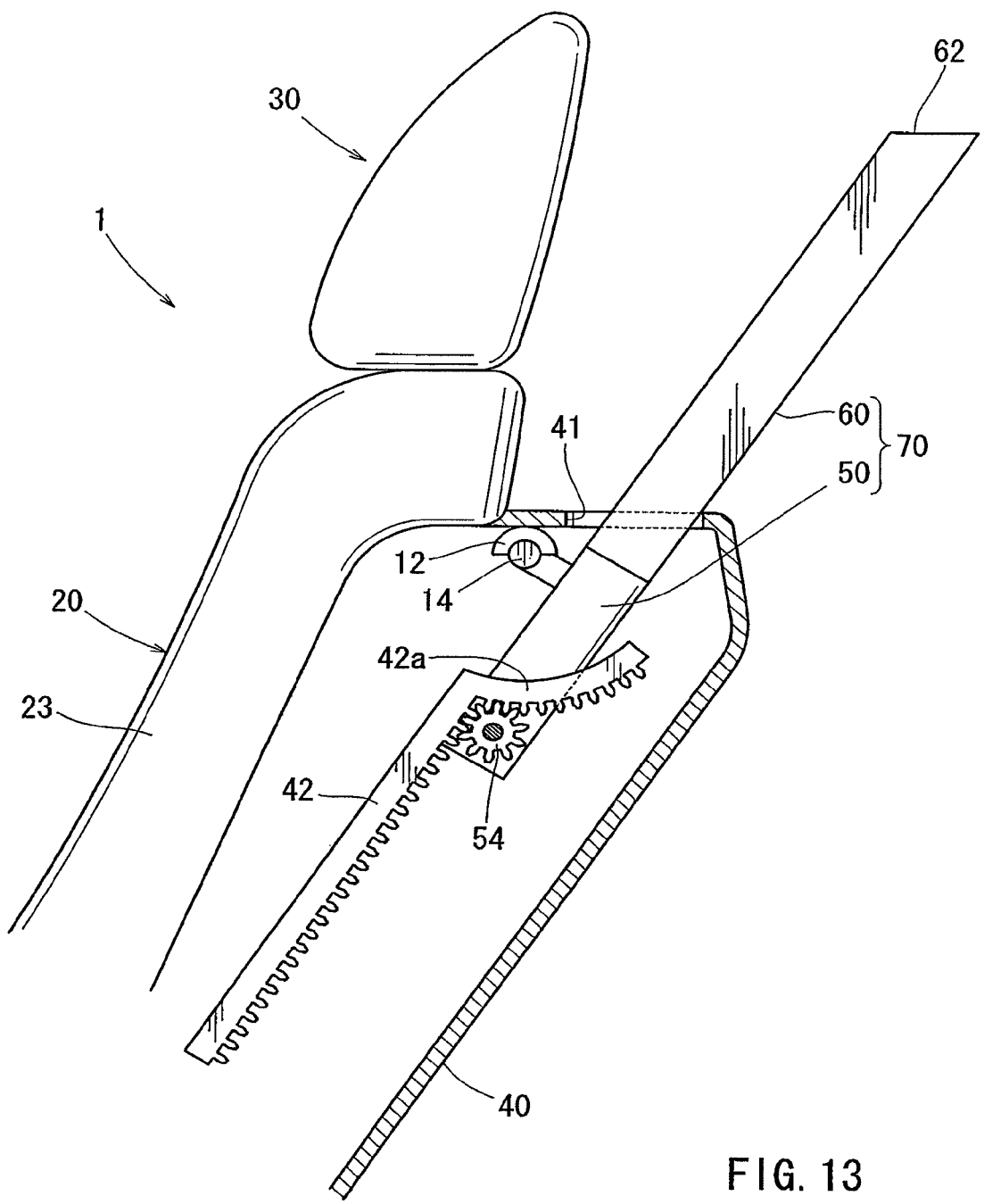
FIG. 13 is a view similar to FIG. 9, which illustrate a modified form of the second embodiment and in which the monitor portion is moved to the use position.

The racks 42 and the additional racks 42a in the second embodiment can be modified, if necessary. For example, in this embodiment, the racks 42 and the additional racks 42a may respectively have the upper toothed surfaces and the upper convex toothed surfaces. However, as shown in FIG. 13, the racks 42 and the additional racks 42a may be changed to respectively have lower toothed surfaces and lower convex toothed surfaces. As will be recognized, in such a case, positions of the engagement projections 12 and the engagement pins 14 will be changed such that the engagement pins 14 do not interfere with the additional racks 42a when the monitor portion 60 (the base portion 50) moves between the retracted position and the use position.

Third Detailed Representative Embodiment

The third detailed representative embodiment will now described in detail with reference to FIGS. 14 to 20.

Because the third embodiment relates to the first embodiment, only the constructions and elements that are different from the first embodiment will be explained in detail. Elements that are the same in the first and third embodiments will be identified by the same reference numerals and a detailed description of such elements may be omitted.

However, in this embodiment, the vehicle seat 1 may preferably include an automatic monitor controlling system. The automatic monitor controlling system may function as an automatic monitor retracting system that can automatically move the monitor portion 60 (the monitor device 70) from the use position to the retracted position when a vehicle collision is predicted. Further, in this embodiment, the use position and the retracted position of the monitor portion 60 can respectively be referred to as the use position and the retracted position of the monitor device 70.

As shown in FIGS. 15 to 17 and 19, the vehicle seat 1 having the monitor device 70 has substantially the same construction as the seat 1 of the first embodiment except for, for example, the shape of the back board 40, the shape of the upper end surface 62 of the monitor portion 60 and the inclination angle of the monitor device 70.

Further, in this embodiment, the guide frames 43 may preferably be attached to the guide portions 40a of the back board 40 in such a manner that the guide frames 43 can be easily detached from the guide portions 40a of the back board 40 when a substantial load is applied to the guide frames 43. That is, the guide frames 43 may preferably be attached to the back board 40 via weakened attaching mechanisms. Generally, when the monitor portion 60 that is located in the use position is applied with the substantial load, a corresponding load is applied to the guide frames 43 via the base portion 50. In such cases, the guide frames 43 can be easily detached from the guide portions 40a of the back board 40.

Figure 14:
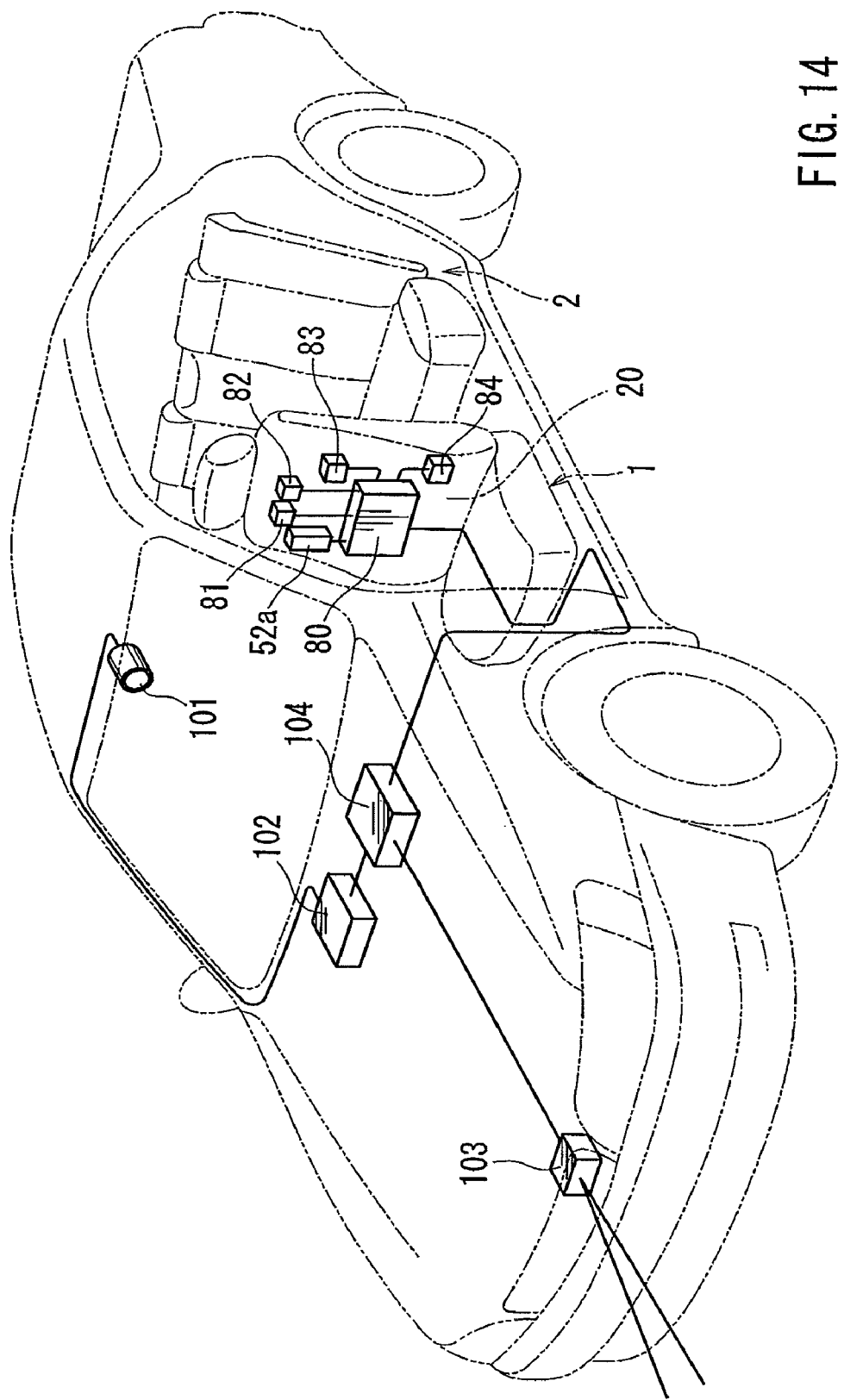
FIG. 14 is a front perspective view of a vehicle having a vehicle seat according to a third embodiment of the present invention.
Figure 15:
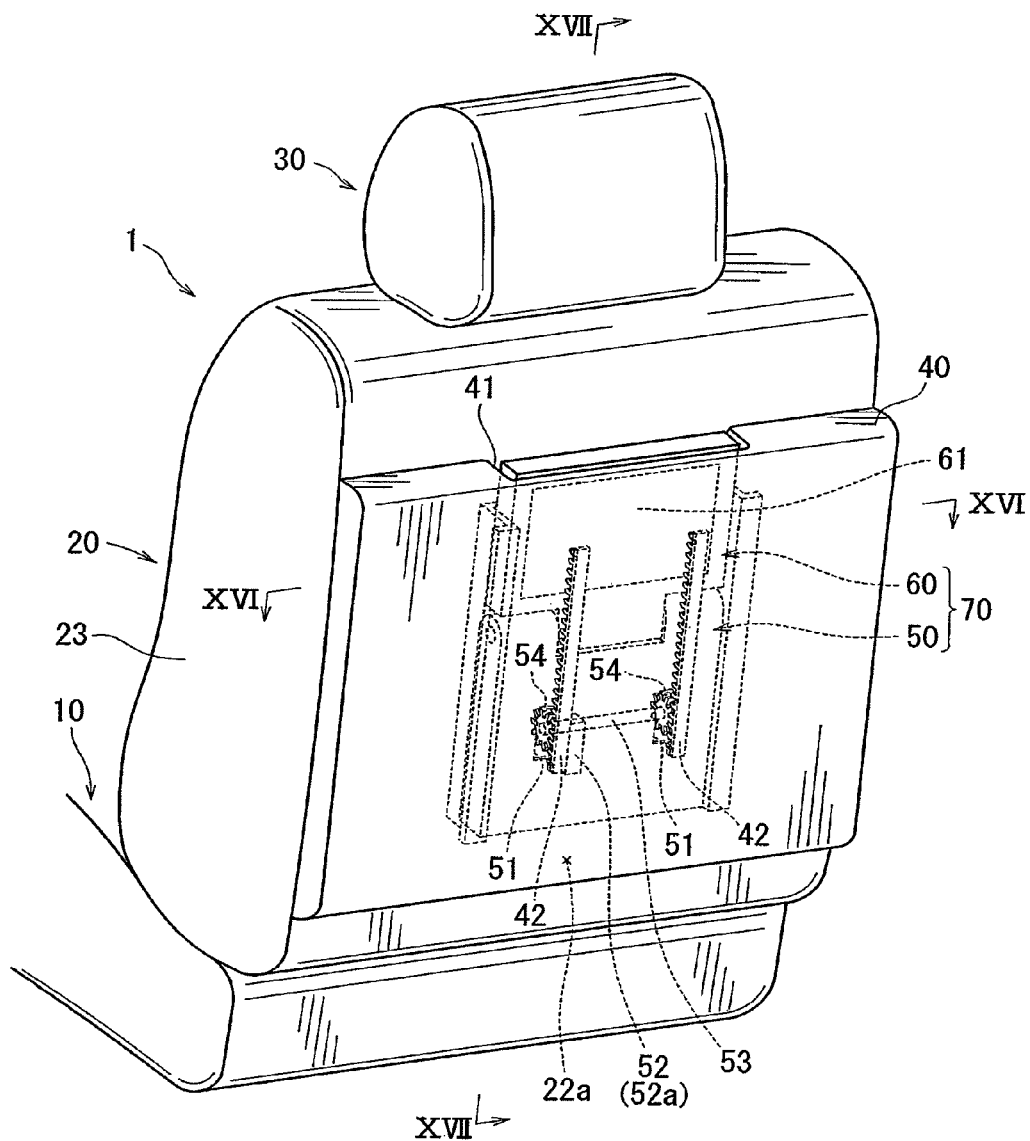
FIG. 15 is a rear perspective view of the vehicle seat, which illustrates a condition in which a monitor portion of a monitor device is located in a retracted position.
Figure 16:
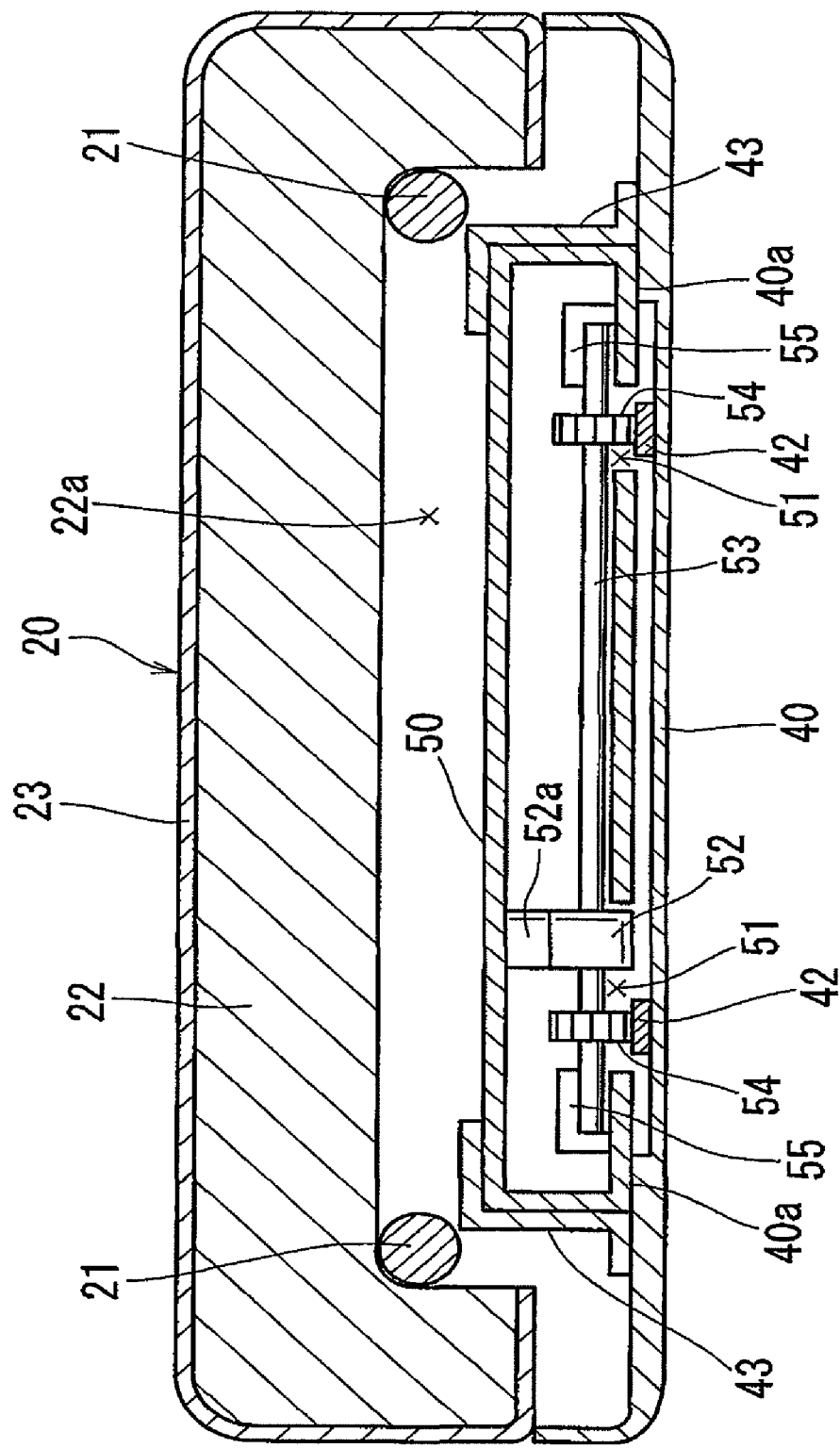
FIG. 16 is a cross-sectional view taken along line XVI-XVI in FIG. 15.

As shown in FIG. 14, the automatic monitor controlling system may preferably include a seat controlling electronic control unit (ECU) 80 that is embedded in the seat back 20. The seat controlling ECU 80 is electrically connected to a first or opening switch 81 and a second or closing switch 82 that are respectively attached to the seat 1. The opening switch 81 may function to move the monitor portion 60 (the monitor device 70) from the retracted position to the use position. Conversely, the closing switch 82 may function to move the monitor portion 60 (the monitor device 70) from the use position to the retracted position. As will be recognized, the opening switch 81 and the closing switch 82 may preferably be disposed on the seat 1 so as to be conveniently operated by the rear passenger.

Figure 17:
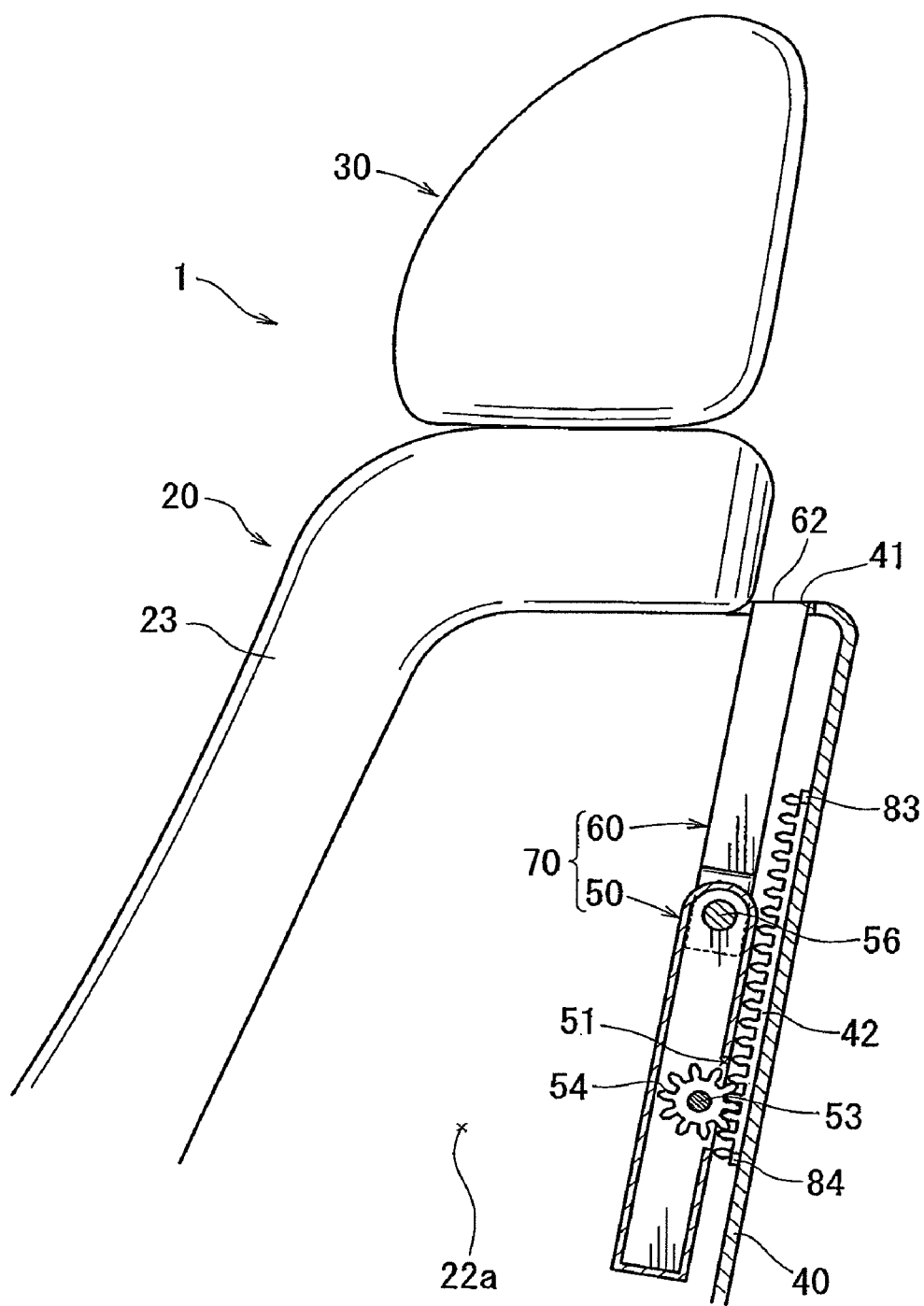
FIG. 17 is a cross-sectional view taken along line XVII-XVII in FIG. 15.

Further, as shown in FIG. 14, the seat controlling ECU 80 is electrically connected to a first or upper limit switch 83 and a second or lower limit switch 84. As shown in FIG. 17, the upper and lower limit switches 83 and 84 are respectively attached to upper and lower end portions of the racks 42. As will be appreciated, the upper limit switch 82 may function to detect the monitor portion 60 that is located in the use position. That is, the upper limit switch 82 is arranged and constructed to be switched on when the monitor portion 60 is located in the use position. Conversely, the lower limit switch 84 may function to detect the monitor portion 60 that is located in the retracted position. That is, the lower limit switch 84 is arranged and constructed to be switched on when the monitor portion 60 is located in the retracted position. In addition, the seat controlling ECU 80 is electrically connected to the motor 52a of the gearing device 52 (i.e., the drive mechanism).

Further, the automatic monitor controlling system may preferably include a vehicle-installed collision prediction system (i.e., a pre-crush safety system) that is electrically communicated with the seat controlling ECU 80. In particular, as shown in FIG. 14, the collision prediction system may preferably composed of a camera 101, an image processing ECU 102, a millimeter-wave radar 103 and a vehicle controlling ECU 104. The vehicle controlling ECU 104 is electrically connected to the camera 101 via the image processing ECU 102 and is electrically connected to the millimeter-wave radar 103. The vehicle controlling ECU 104 thus connected is then electrically connected to the seat controlling ECU 80.

The camera 101 is arranged and constructed to take a picture of a predetermined area in front of the vehicle. The camera 101 may generally be positioned at an inner front end portion of a vehicle roof. The image processing ECU 102 is constructed to receive and process the picture taken by the camera 101, so as to detect objects or obstacles positioned in front of the vehicle. The image processing ECU 102 may preferably be disposed in an engine compartment of the vehicle. Further, the millimeter-wave radar 103 is arranged and constructed to scan a predetermined range in front of the vehicle via millimeter wave, so as to detect the obstacles positioned therein. The millimeter-wave radar 103 may preferably be positioned at a front end portion of the vehicle.

The vehicle controlling ECU 104 is constructed to receive and analyze signals from the image processing ECU 102 and the millimeter-wave radar 103, thereby predicting or detecting a possible collision of the vehicle with the obstacles. When the vehicle controlling ECU 104 determines that the vehicle collision cannot be avoided (i.e., when the possible collision is predicted), the vehicle controlling ECU 104 can transmit a collision prediction signal to the seat controlling ECU 80. Further, the vehicle controlling ECU 104 is constructed to transmit an all-clear signal to the seat controlling ECU 80 when the vehicle controlling ECU 104 determines that the vehicle collision can be avoided, even if the collision prediction signal is transmitted to the seat controlling ECU 80.

Operation of the monitor device 70 of the present embodiment will now be described.

The monitor device 70 of the present embodiment can be operated in substantially the same manner as the first embodiment. That is, in order to use the monitor device 70, the drive motor 52a of the gearing device 52 is rotated in the normal direction by operating the opening switch 81, so as to move the monitor portion 60 from the retracted position (FIG. 15) to the use position (FIG. 19) via the slot 41. Further, when the monitor portion 60 reaches the use position, the upper limit switch 83 is switched on. As a result, a signal is transmitted from the upper limit switch 83 to the seat controlling ECU 80, so that the drive motor 52a can be stopped by the seat controlling ECU 80. Thus, the monitor portion 60 (the monitor device 70) can be automatically stopped at the use position. Conversely, in order to retract the monitor device 70, the drive motor 52a is rotated in the reverse direction by operating the closing switch 82, so as to move the monitor portion 60 from the use position to the retracted position. Further, when the monitor portion 60 reaches the retracted position, the lower limit switch 84 is switched on. As a result, a signal is transmitted from the lower limit switch 84 to the seat controlling ECU 80, so that the drive motor 52a can be stopped by the seat controlling ECU 80. Thus, the monitor portion 60 (the monitor device 70) can be automatically stopped at the retracted position.

Figure 18:
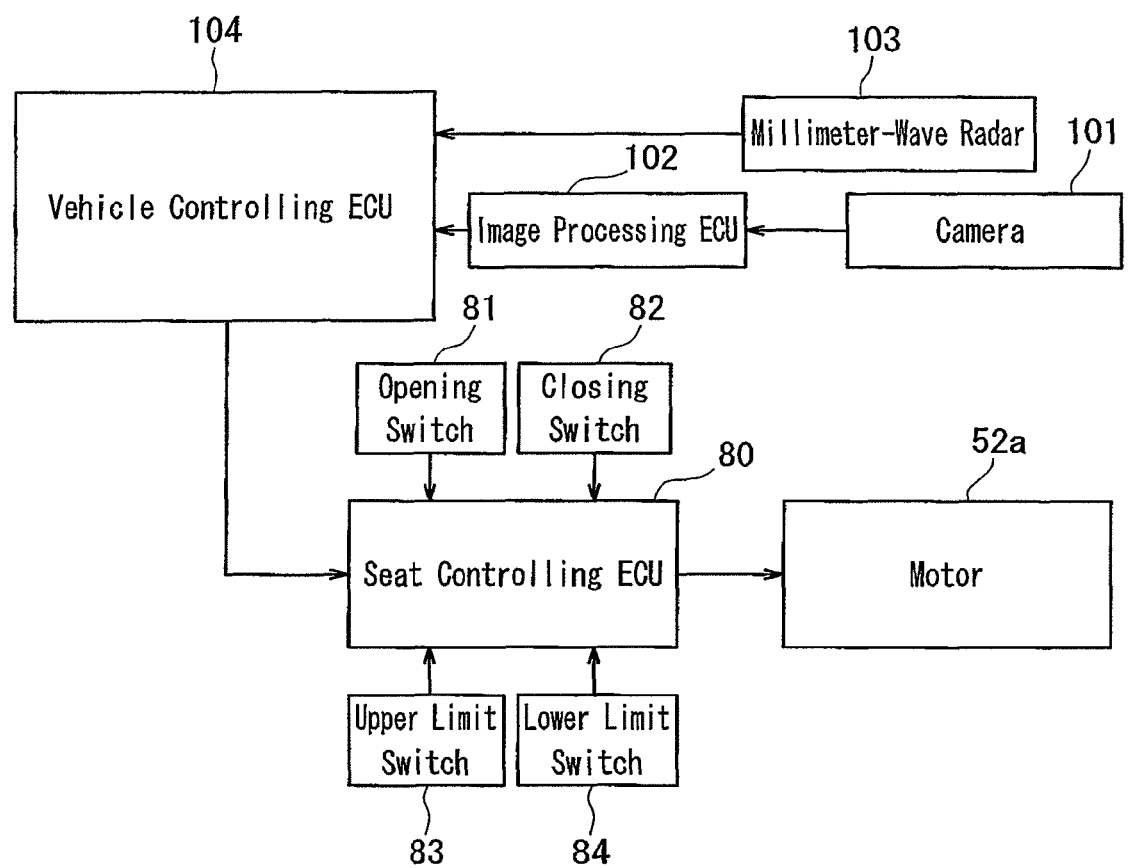
FIG. 18 is a block diagram illustrating an automatic monitor controlling system of the vehicle seat.
Figure 19:
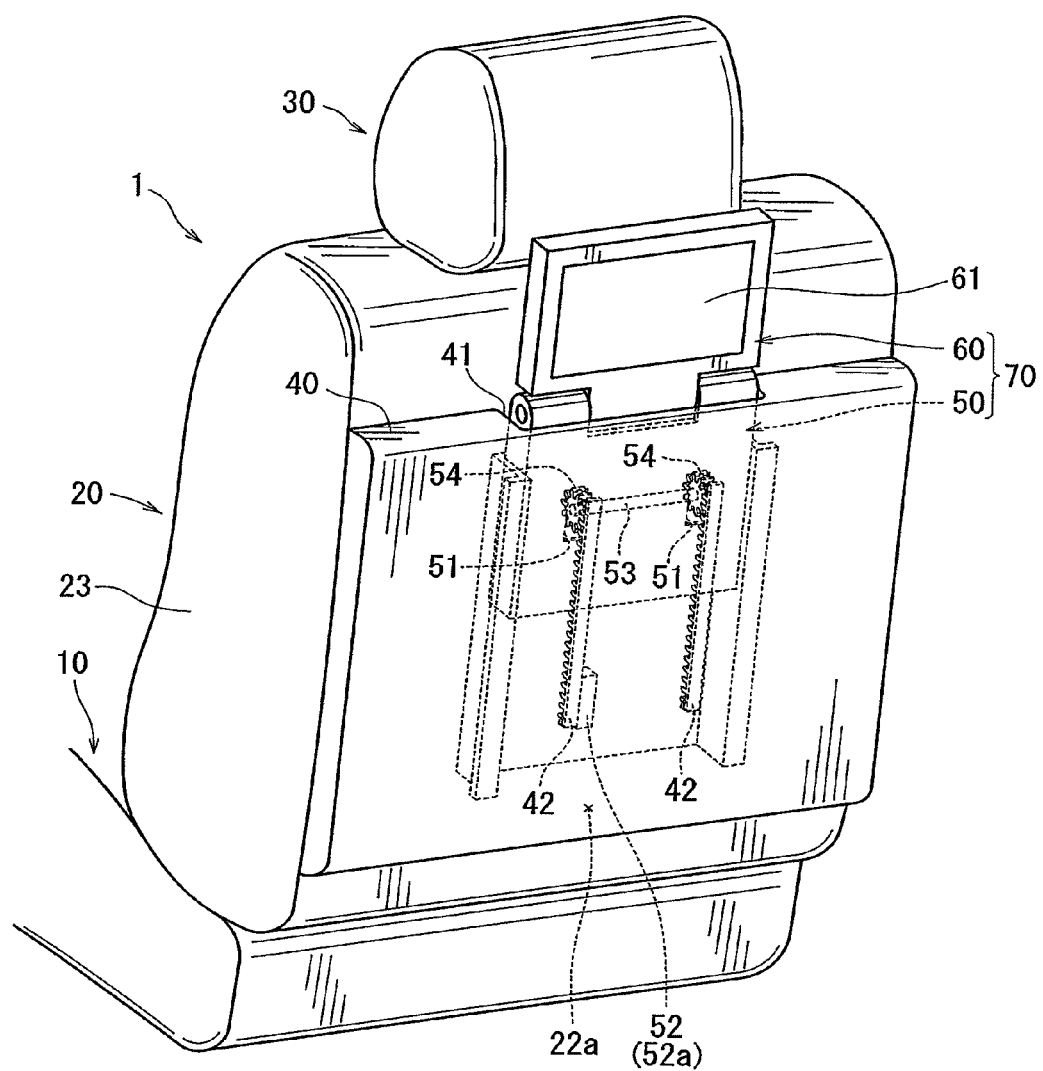
FIG. 19 is a view similar to FIG. 15, which illustrates a condition in which the monitor portion is located in a use position.
Figure 20:
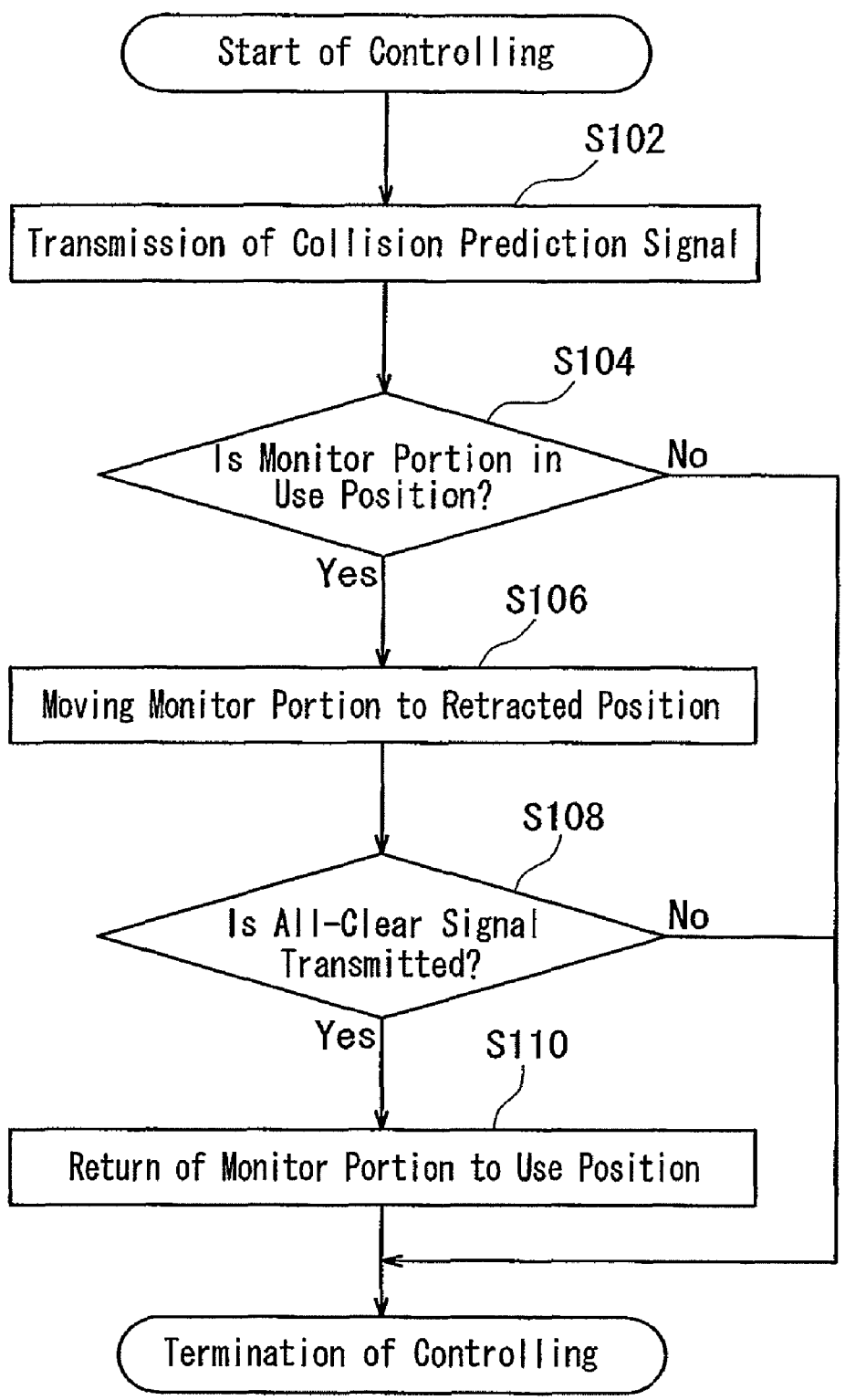
FIG. 20 is a flow chart illustrating a controlling process of the automatic monitor controlling system.

Next, a controlling process of the automatic monitor controlling system will now be described in detail with reference to FIGS. 18 and 20. Typically, the controlling process of the automatic monitor controlling system is started when an ignition switch is turned ON. Also, the controlling process is repeated in a desired time interval.

First, when the collision prediction signal from the vehicle controlling ECU 104 is transmitted to the seat controlling ECU 80 (step S102), the seat controlling ECU 80 determines if the monitor portion 60 is located in the use position or the retracted position based on the signals from the upper and lower limit switches 83 and 84 (step S104). If the seat controlling ECU 80 determines that the monitor portion 60 is located in the use position ("Yes" in step S104), the seat controlling ECU 80 rotates the drive motor 52a in the reverse direction so as to actuate the gearing device 52 (i.e., actuates the drive mechanism), thereby forcibly moving the monitor portion 60 to the retracted position (step S106).

Next, the seat controlling ECU 80 determines if the all-clear signal is transmitted from the vehicle controlling ECU 104 to the seat controlling ECU 80 (step S108). If the seat controlling ECU 80 determines that the all-clear signal from the vehicle controlling ECU 104 is transmitted thereto ("Yes" in step S108), the seat controlling. ECU 80 rotates the drive motor 52*a* in the normal direction, thereby returning the monitor portion 60 to the use position (step S110). Thus, the controlling process of the automatic monitor controlling system is terminated.

However, if the seat controlling ECU 80 determines that the monitor portion 60 is located in the retracted position ("No" in step S104), the controlling process is directly terminated. Also, if the seat controlling ECU 80 determines that the all-clear signal from the vehicle controlling ECU 104 is not transmitted thereto ("No" in step S108), the controlling process is terminated. Thereafter, the controlling process is repeated.

In the present embodiment, the monitor portion 60 can be automatically moved to the retracted position before the vehicle collides with the obstacles. Therefore, even if the vehicle collision actually happens, the rear passenger can be effectively prevented form contacting the monitor portion 60. As a result, the monitor portion 60 can be effectively prevented form being damaged. In addition, the passenger can be effectively prevented form being injured.

Further, when the vehicle collision is avoided after the monitor portion 60 moved to the retracted position, the monitor portion 60 can be automatically returned to the use position. Therefore, it is not necessary to manually operate the opening switch 81 in order to move the monitor portion 60 to the use position.

In this embodiment, the guide frames 43 is easily detachably attached to the back board 40 via the weakened attaching mechanisms. Therefore, even if the rear passenger hardly contacts the monitor portion 60 that is located in the use position, the monitor portion 60 can be released from the back board 40 with the guide frames 43, thereby absorbing impact against the rear passenger. In addition, the released monitor portion 60 can be received by the head rest 30 having a cushion pad (not shown). As a result, the passenger can be effectively prevented form being injured.

Fourth Detailed Representative Embodiment

Figure 22:
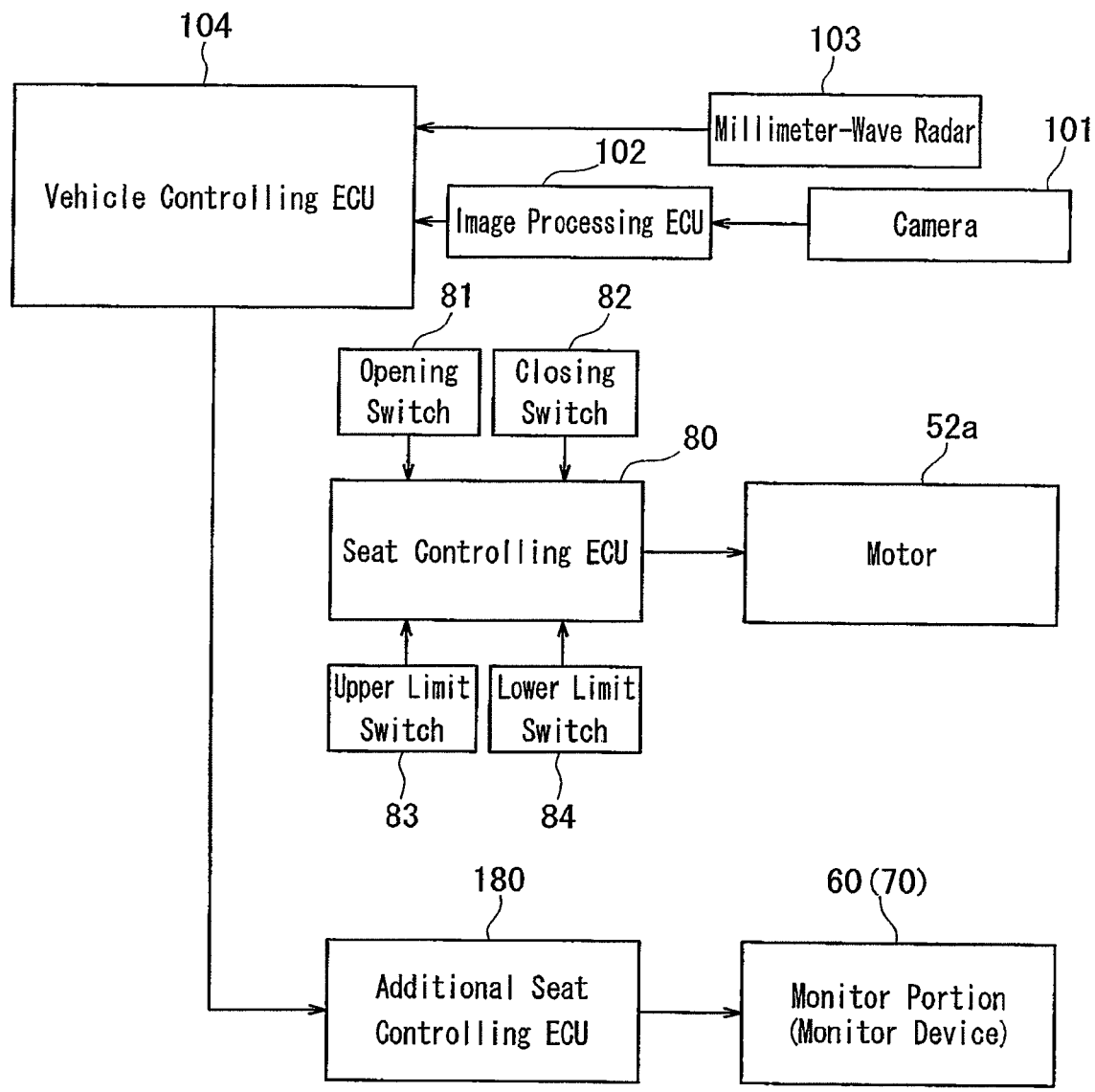
FIG. 22 is a block diagram illustrating an automatic monitor controlling system of the vehicle seat.
Figure 23:
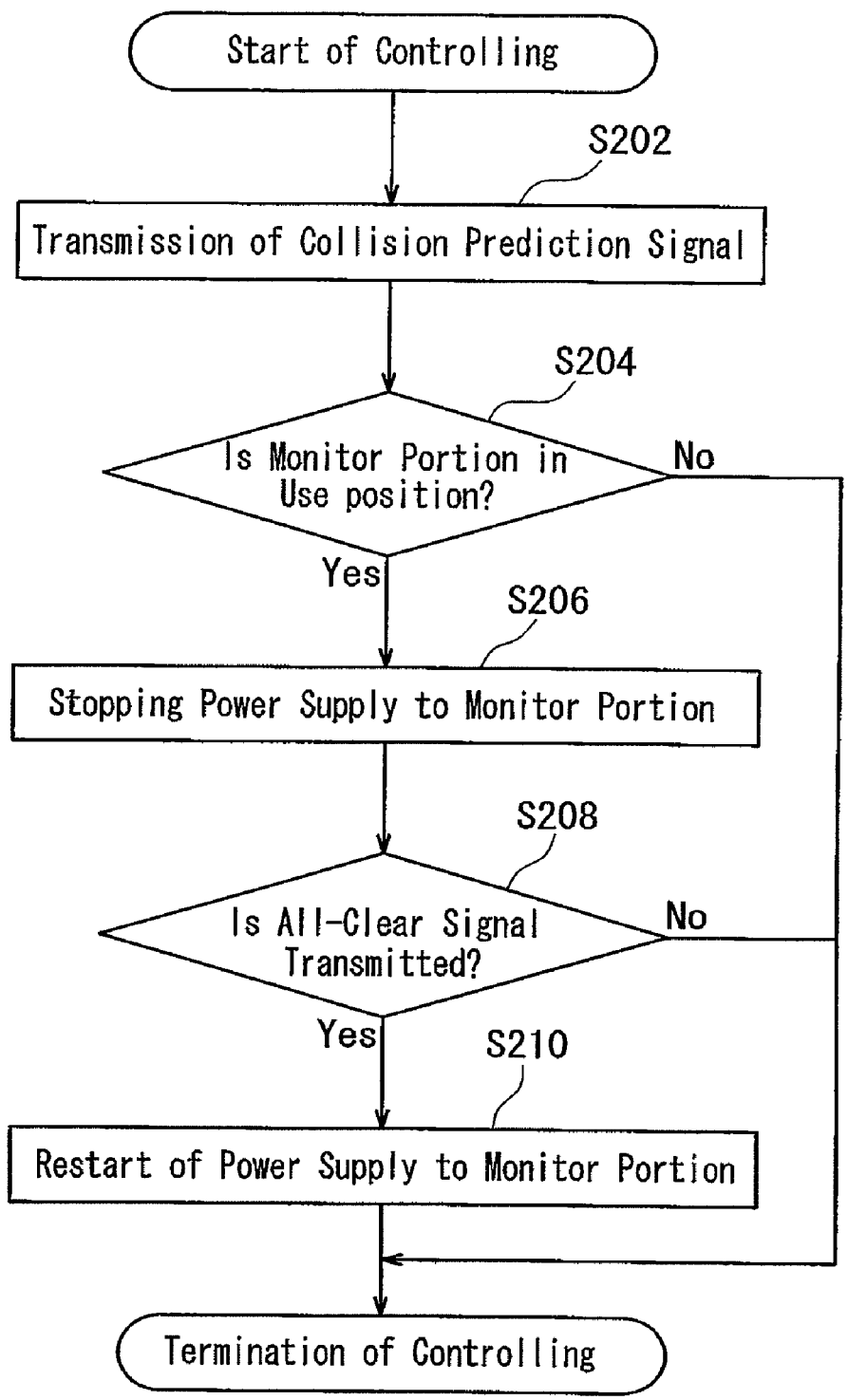
FIG. 23 is a flow chart illustrating a controlling process of the automatic monitor controlling system.

The fourth detailed representative embodiment will now described in detail with reference to FIGS. 21 to 23.

Because the fourth embodiment relates to the third embodiment, only the constructions and elements that are different from the third embodiment will be explained in detail. Elements that are the same in the third and fourth embodiments will be identified by the same reference numerals and a detailed description of such elements may be omitted.

In this embodiment, similar to the third embodiment, the vehicle seat 1 may preferably include the automatic monitor controlling system. However, unlike the third embodiment, the automatic monitor controlling system may function as an automatic power supply cutting-off system that can automatically cut off power supply to the monitor portion 60 when a vehicle collision is predicted.

Figure 21:
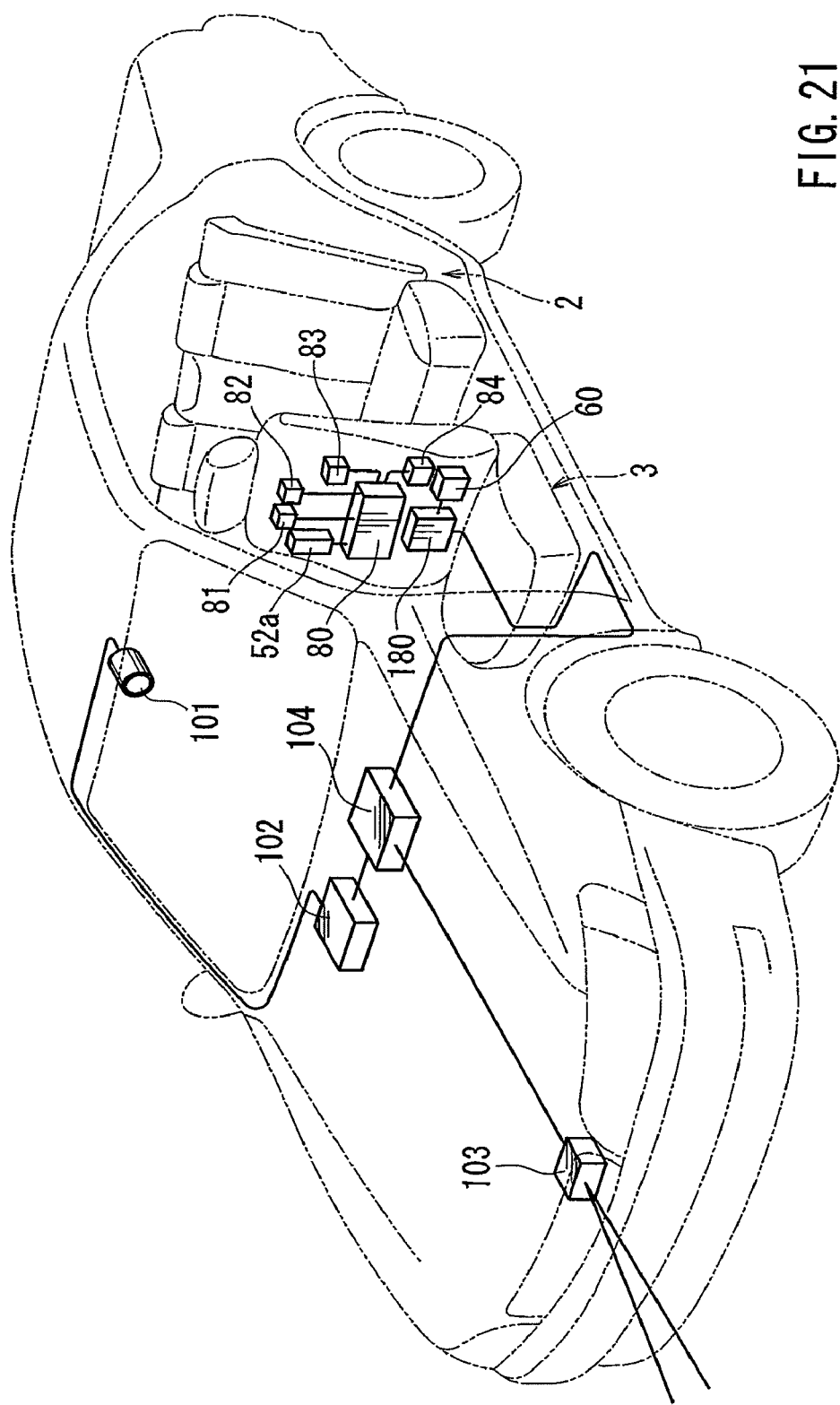
FIG. 21 is a front perspective view of a vehicle having a vehicle seat according to a fourth embodiment of the present invention.

In this embodiment, as shown in FIG. 21, the automatic monitor controlling system may further include an additional seat controlling ECU 180 that is embedded in the seat back 20. The vehicle controlling ECU 104 is electrically connected to the additional seat controlling, ECU 180 and not the seat controlling ECU 80. Also, the additional seat controlling ECU 180 is electrically connected to the monitor portion 60 (the monitor device 70) so as to provide the power supply thereto.

Operation of the monitor device 70 of the present embodiment will now be described.

The monitor device 70 of the present embodiment can be operated in substantially the same manner as the third embodiment. That is, in order to use the monitor device 70, the drive motor 52*a* of the gearing device 52 is rotated in the normal direction by operating the opening switch 81, so as to move the monitor portion 60 (the monitor device 70) from the retracted position to the use position. Conversely, in order to retract the monitor device 70, the drive motor 52*a* is rotated in the reverse direction by operating the closing switch 82, so as to move the monitor portion 60 (the monitor device 70) from the use position to the retracted position.

Next, the controlling process of the automatic monitor controlling system will now be described in detail with reference to FIGS. 22 and 23. Typically, similar to the third embodiment, the controlling process of the automatic monitor controlling system is started when an ignition switch is turned ON. Also, the controlling process is repeated in a desired time interval.

First, when the collision prediction signal from the vehicle controlling ECU 104 is transmitted to the additional seat controlling ECU 180 (step S202), the seat controlling ECU 80 determines if the monitor portion 60 (the monitor device 70) is located in the use position or the retracted position based on the signals from the upper and lower limit switches 83 and 84 (step S204). If the additional seat controlling ECU 180 determines that the monitor portion 60 is located in the use position ("Yes" in step S204), the additional seat controlling ECU 180 stops or cuts off the power supply to the monitor portion 60 (step S206).

Next, the additional seat controlling ECU 180 determines if the all-clear signal is transmitted from the vehicle controlling ECU 104 to the additional seat controlling ECU 180 (step S208). If the additional seat controlling ECU 180 determines that the all-clear signal from the vehicle controlling ECU 104 is transmitted thereto ("Yes" in step S208), the additional seat controlling ECU 180 restarts the power supply to the monitor portion 60 (step S210). Thus, the controlling process of the automatic monitor controlling system is terminated.

However, if the additional seat controlling ECU 180 determines that the monitor portion 60 is located in the retracted position ("No" in step S204), the controlling process is directly terminated. Also, if the additional seat controlling ECU 180 determines that the all-clear signal from the vehicle controlling ECU 104 is not transmitted thereto ("No" in step S208), the controlling process is terminated. Thereafter, the controlling process is repeated.

In the present embodiment, the power supply to the monitor portion 60 can be automatically stopped before the vehicle collides with the obstacles. Therefore, even if the vehicle collision actually happens, the monitor portion 60 can effectively be avoided from being fired or over heated due to wiring disconnection produced therein.

Further, when the vehicle collision is avoided after the power supply to the monitor portion 60 is stopped, the power supply to the monitor portion 60 can be automatically restarted. Therefore, it is not necessary to manually restart the power supply to the monitor portion 60.

Various changes and modifications may be made to the present invention without departing from the scope of the invention. For example, in the third embodiment, the automatic monitor controlling system is arranged and constructed to function as the automatic monitor retracting system. Conversely, in the fourth embodiment, the automatic monitor controlling system is arranged and constructed to function as the automatic power supply cutting-off system. However, the automatic monitor controlling system can be arranged and constructed to function as the automatic monitor retracting system and the automatic power supply cutting-off system. In other words, the vehicle controlling ECU 104 can be connected to both of the seat controlling ECU 80 and the additional seat controlling ECU 180. In such a case, timing of moving of the monitor portion 60 to the retracted position and timing of cutting-off of the power supply to the monitor portion 60 can be appropriately determined.

What is claimed is:

1. A vehicle seat, comprising:
   a monitor device that is movably disposed in a back board of a seat back, the monitor device including a base portion and a monitor portion; and
   a drive mechanism configured to move the monitor portion through a slot formed in the back board between a retracted position in which the monitor portion is positioned in an interior of the back board and a use position in which the monitor is positioned in an exterior of the back board,
   wherein the base portion is movably connected to the back board,
   wherein the monitor portion is connected to the base portion so as to be rotatable about an axis that is perpendicular to a moving direction of the monitor portion,
   wherein the drive mechanism comprises:
   a transverse rotary shaft rotatably supported by a bearing member that is disposed in the base portion;
   a pinion gear unrotatably attached to the rotary shaft;
   a rack positioned along the back board and meshing with the pinion gear; and
   a gearing device coupled to the rotary shaft, and
   wherein when the rotary shaft is rotated by the gearing device, the pinion gear is rotated along the rack, such that the base portion is moved, and such that the monitor portion is moved between the retracted position and the use position while a display surface of the monitor portion is generally maintained parallel to the back board.

2. The vehicle seat as defined in claim 1, wherein an end surface of the monitor portion is shaped, so as to substantially be flush with an outer surface of the back board when the monitor portion is located in the retracted position.

* * * * *